United States Patent
Usui et al.

(10) Patent No.: US 11,627,235 B2
(45) Date of Patent: Apr. 11, 2023

(54) IMAGE FORMING APPARATUS, APPLICATION PERMISSION SYSTEM, AND APPLICATION-CODE INFORMATION GENERATION METHOD

(71) Applicant: SHARP KABUSHIKI KAISHA, Sakai (JP)

(72) Inventors: Takashi Usui, Sakai (JP); Tomoki Minamikawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/524,599

(22) Filed: Nov. 11, 2021

(65) Prior Publication Data

US 2022/0174183 A1    Jun. 2, 2022

(30) Foreign Application Priority Data

Nov. 30, 2020    (JP) .............................. JP2020-198696

(51) Int. Cl.
*H04N 1/44*    (2006.01)
*H04N 1/00*    (2006.01)
*H04N 1/32*    (2006.01)

(52) U.S. Cl.
CPC ......... *H04N 1/4433* (2013.01); *H04N 1/0097* (2013.01); *H04N 1/00244* (2013.01); *H04N 1/32101* (2013.01); *H04N 2201/0094* (2013.01)

(58) Field of Classification Search
CPC ............ H04N 1/4433; H04N 1/00244; H04N 1/0097; H04N 1/32101; H04N 1/0094
USPC ......................................................... 358/1.14
See application file for complete search history.

(56) References Cited

U.S. PATENT DOCUMENTS

| | | | |
|---|---|---|---|
| 2008/0011854 A1* | 1/2008 | Idaka | G06K 1/121 235/462.01 |
| 2008/0180753 A1* | 7/2008 | Maeno | G06F 21/608 382/100 |
| 2008/0316523 A1* | 12/2008 | Klinefelter | G07F 7/1008 358/1.14 |

FOREIGN PATENT DOCUMENTS

WO     2017/221529 A1    12/2017

* cited by examiner

*Primary Examiner* — Allen H Nguyen
(74) *Attorney, Agent, or Firm* — ScienBiziP, P.C.

(57) ABSTRACT

An image forming apparatus includes an acquirer, a storage, and a controller. The acquirer acquires supplies-specific information uniquely attached to supplies used or consumed in image formation. The storage stores apparatus-specific information. The controller generates a one-time code as authentication information and also generates application code information for applying for apparatus use permission using the one-time code, the supplies-specific information, and the apparatus-specific information.

11 Claims, 25 Drawing Sheets

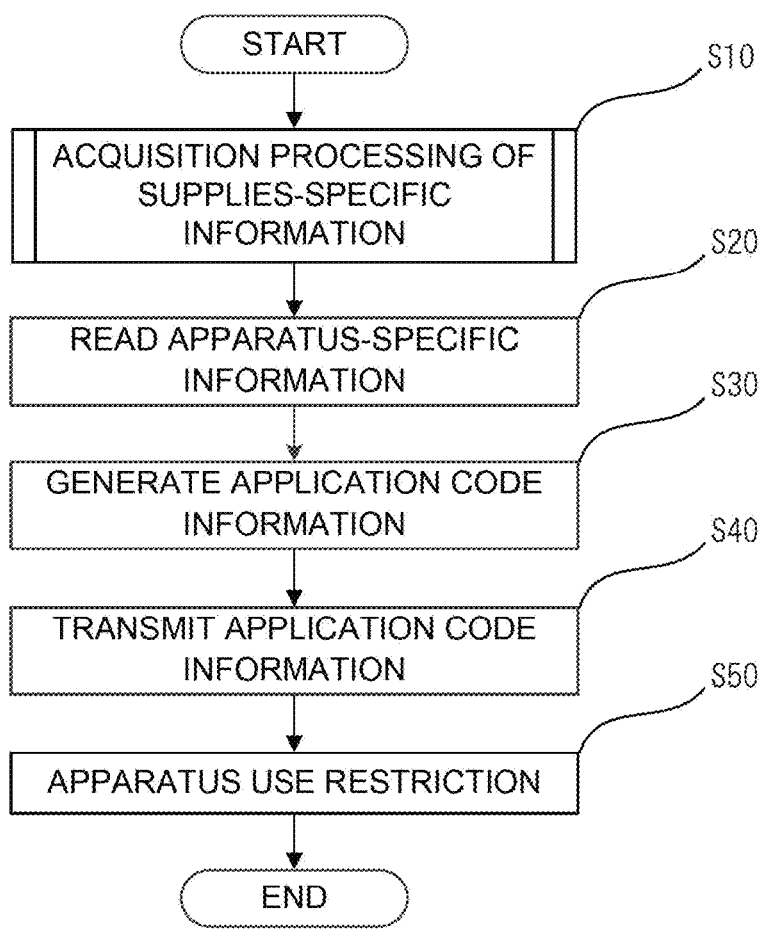

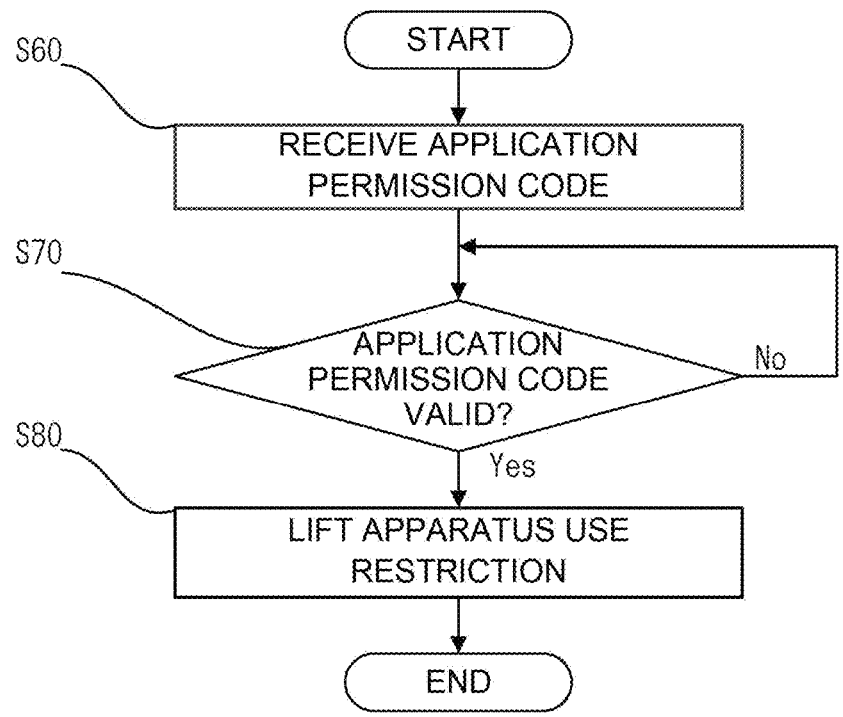

FIG. 7

| USAGE LIMIT INFORMATION | AA | BB | CC |
|---|---|---|---|
| PRINTING FEE | 1000 YEN | 10000 YEN | 100000 YEN |
| NUMBER OF SHEETS PRINTED | ~100 SHEETS | ~1000 SHEETS | ~10000 SHEETS |

IMAGE FORMING APPARATUS, APPLICATION PERMISSION SYSTEM, AND APPLICATION-CODE INFORMATION GENERATION METHOD

CROSS-REFERENCE TO RELATED APPLICATION

The present application claims priority from Japanese Patent Application Number 2020-198696, the content to which is hereby incorporated by reference into this application.

BACKGROUND OF THE INVENTION

1. Field of the Invention

The present invention relates to an image forming apparatus and the like.

2. Description of the Related Art

Conventionally, there is known a technology for canceling invoicing processes and print use restriction by sending management information such as print counter information to a distributor or a maintenance management company of an image forming apparatus (see, for example, WO2017/221529).

By the way, inexpensive non-recommended supplies other than those recommended by a distributor of the image forming apparatus are distributed in the market. Use of the non-recommended supplies is one option for users who want to keep costs down. However, the use of the non-recommended supplies is not covered by print quality guarantee, and in the worst case, it can lead to a failure of the image forming apparatus. In view of such circumstances, the distributor of the image forming apparatus determines whether the attached supplies are recommended or not, and when non-recommended supplies are attached, restriction is applied to the use of the image forming apparatus.

SUMMARY OF THE INVENTION

When the user receives lifting of the apparatus use restriction or offering of appropriate services by sending information necessary for determining the recommended supplies to the distributor of the image forming apparatus or the like, if generation of the information is complicated, the user may neglect to generate the information and send it to the distributor of the image forming apparatus or the like.

In this case, the user may not only be unable to receive offering of appropriate services, but may also be disadvantaged by not being able to use the apparatus before the usage limit of the purchased supplies is reached because the apparatus use restriction is not lifted.

In view of the above-described problem, it is an object of the present disclosure to provide an image forming apparatus and the like, capable of reliably generating apparatus use-permission application information for determining recommended supplies without bothering a user.

In order to solve the above-described problem, an image forming apparatus according to the present disclosure is characterized by including an acquirer that acquires supplies-specific information uniquely attached to supplies used or consumed in image formation, a storage that stores apparatus-specific information, and a controller that generates a one-time code as authentication information and also generates application code information for applying for apparatus use permission using the one-time code, the supplies-specific information, and the apparatus-specific information.

Moreover, an application permission system according to the present disclosure is characterized by including an image forming apparatus having an acquirer that acquires supplies-specific information uniquely attached to supplies used or consumed in image formation, a first storage that stores apparatus-specific information, and a first controller that generates a one-time code as authentication information and generates application code information for applying for apparatus use-permission from the one-time code, the supplies-specific information, and the apparatus-specific information, a server device having a communicator that receives the application code information, a second storage that stores the supplies-specific information, and a second controller that authenticates the one-time code and determines whether newly received supplies-specific information is unregistered or not by collating the newly received supplies-specific information against the supplies-specific information stored in the second storage, in which, when the second controller determines that the newly received supplies-specific information is unregistered, the second controller generates an application permission code that permits the apparatus use, and causes the application permission code to be transmitted to a sender of the application code information via the communicator.

In addition, an application-code information generation method according to the present disclosure is characterized by including an acquisition process of acquiring supplies-specific information uniquely attached to supplies used or consumed in image formation, a storing process of storing apparatus-specific information, a generation process of generating a one-time code as authentication information and of generating application code information for applying for apparatus use permission using the one-time code, the supplies-specific information, and the apparatus-specific information.

According to the present disclosure, an image forming apparatus or the like, capable of reliably generating apparatus-use permission application information with determination on recommended supplies can be provided without bothering a user.

BRIEF DESCRIPTION OF THE DRAWINGS

FIG. 4 is a flowchart for explaining a process of generating application information in the first embodiment;

FIG. 6 is a flowchart for explaining a process after reception of an application permission code in the first embodiment;

FIG. 7 is a table for explaining usage limit information in the first embodiment;

DETAILED DESCRIPTION OF THE INVENTION

An embodiment for implementing the present disclosure will be explained below with reference to the drawings. In this embodiment, as an example of an image forming apparatus, a configuration of a multifunction machine having a plurality of functions such as a print function, a copy function, or a fax transmission function will be described, but it is needless to say that the present disclosure can be applied to a printer, a copying apparatus, or a fax apparatus having these functions separately. The following embodiments are examples for explaining the present disclosure, and a technical scope of the invention described in claims is not limited to the following description.

1. First Embodiment

1.1 Overall Configuration

Figure 1:
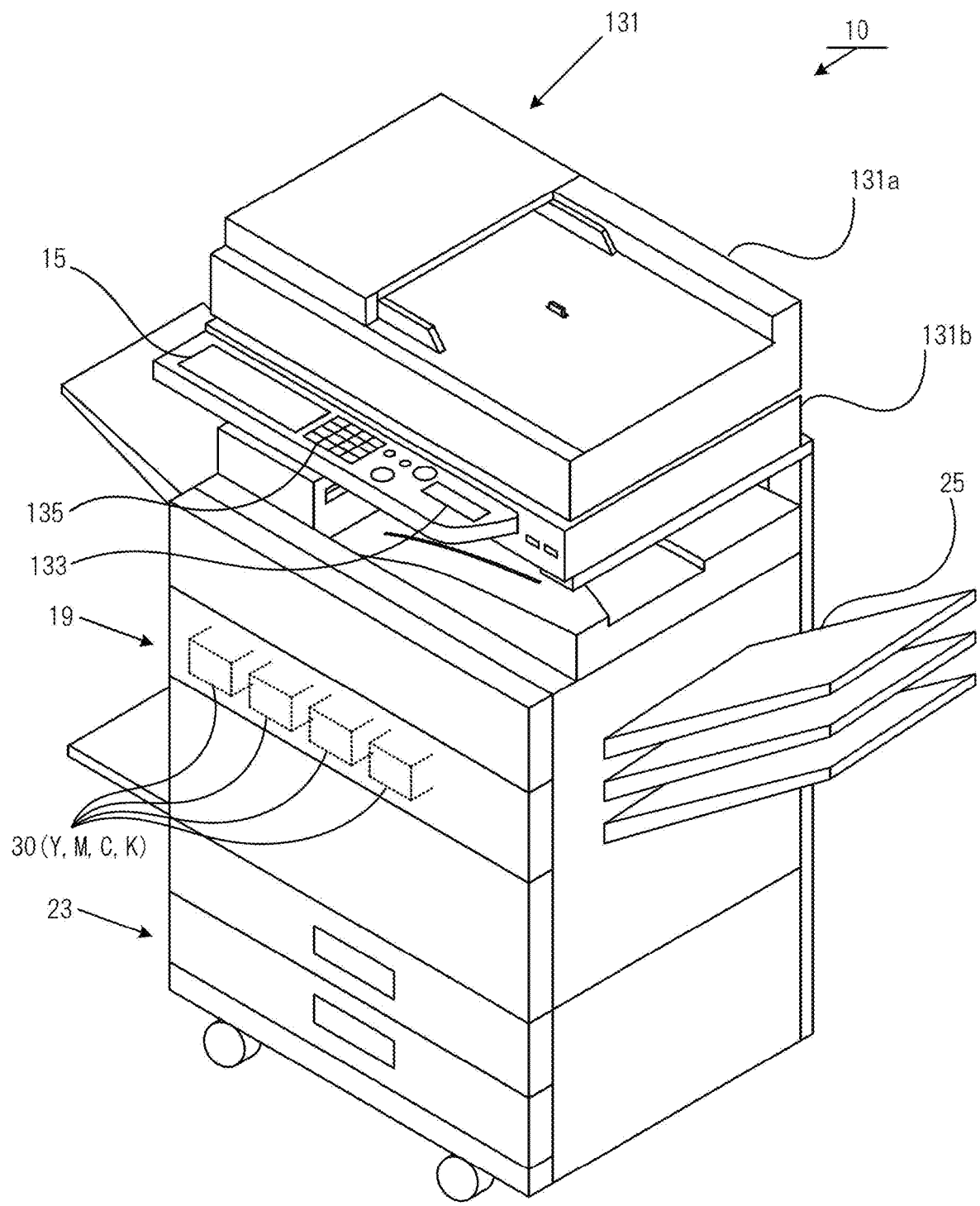
FIG. 1 is an appearance perspective view of an image forming apparatus in a first embodiment.

An overall configuration of an image forming apparatus 10 according to this embodiment will be described using an appearance perspective view of FIG. 1. The image forming apparatus 10 includes an image reader 131 in which a manuscript holding member 131a and a document loading stand 131b are configured to be capable of being opened and closed, an information reader 133, an inputter 135, a display 15, and an image former 19.

1.2 Functional Configuration

Figure 2:
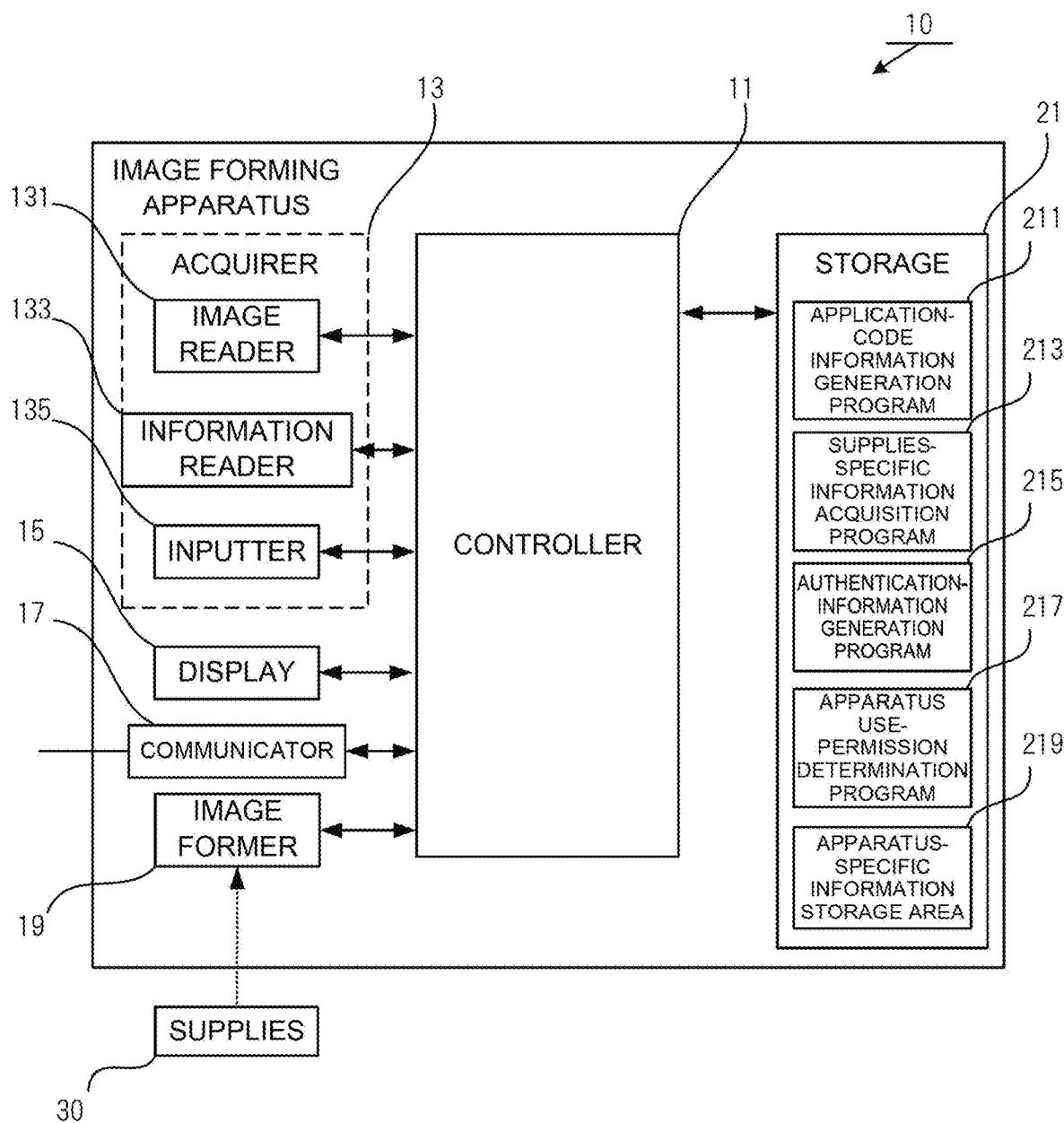
FIG. 2 is a functional configuration diagram of the image forming apparatus in the first embodiment.

FIG. 2 is a diagram for explaining a functional configuration of the image forming apparatus 10 of this embodiment. As shown in FIG. 2, the image forming apparatus 10 includes a controller 11 as a controller or a first controller, an acquirer 13 as an acquirer, a display 15, a communicator 17, an image former 19, and a storage 21 as a storage or a first storage.

The controller 11 controls the entire image forming apparatus 10. The controller 11 is constituted by, for example, one or a plurality of arithmetic devices (such as CPU (Central processing units)). The controller 11 realizes various functions by reading and executing various programs stored in the storage 21. In this embodiment, the controller 11 realizes each function by reading and executing an application-code information generation program 211, a supplies-specific information acquisition program 213, an authentication-information generation program 215, or an apparatus use-permission determination program 217 described below.

The acquirer 13 includes the image reader 131, the information reader 133, and the inputter 135. The acquirer 13 acquires supplies-specific information described below that is individually given to the supplies.

The image reader 131 generates image data by reading an image to be read. The image reader 131 can be constituted by a scanner device or the like that converts an image into an electric signal by an image sensor such as a CCD (Charge coupled device) or a CIS (Contact image sensor), and generates digital data by quantizing and encoding the electric signal.

The information reader 133 reads information stored in an IC (Integrated circuit) chip, a magnetic tape or the like by a contact method or a (short-range) non-contact method. The information reader 133 can be constituted by an IC card reader, an NFC (Near field communication) reader, a magnetic reader or the like.

The inputter 135 accepts a manual input of information by the user. The inputter 135 can be constituted by hard keys (a numeric keypad, for example), buttons and the like. The inputter 135 can be also constituted by a touch panel that allows input via the display 15. In this case, a resistive film method, an infrared method, an electromagnetic induction method, and a capacitance method can be employed as an input detection method of the touch panel, for example.

The display 15 displays various types of information to the user. The display 15 can be constituted by an LCD (Liquid crystal display), an organic EL (Electro-luminescence) display or the like, for example.

The communicator 17 is connected to other devices via a network and transmits and receives various types of information. The communicator 17 is constituted as a communicable interface, for example, and as the connection method, either one of or both of wired/wireless can be employed.

The image former 19 feeds a recording medium from a paper feed tray 23, forms an image based on the image data on the recording medium, and then discharges the paper onto a paper discharge tray 25, for example. The image former 19 can be constituted by a laser printer or the like using an electrophotographic method, for example. The image former 19 performs image formation by using toner supplied from supplies 30 (toner cartridges Y, M, C, K) corresponding to respective toner colors (such as yellow (Y), magenta (M), cyan (C), and black (K)). The image forming apparatus 10 is constituted so that the supplies such as the toner, the recording medium and the like can be supplied as appropriate to enable continuous image formation.

By the way, the supplies that supply toner and the like to the image former 19 are often given information that indicates suitability to the image forming apparatus and characteristics of the supplies themselves. In particular, from the viewpoint of ensuring a printing quality and reducing a risk of an apparatus failure, a manufacturer of the image forming apparatus or a vendor of the supplies attaches information indicating that the supplies are recommended products (in this embodiment, such information is referred to as supplies-specific information) to each of the supplies, and restricts use of the supplies when non-recommended supplies are supplied to the image forming apparatus. In this embodiment, an application procedure for apparatus use permission is carried out using the supplies-specific information uniquely attached to the supplies in order to carry out the application procedure for apparatus use permission involving determination on recommended supplies at appropriate timing without bothering the user.

Figure 3A:
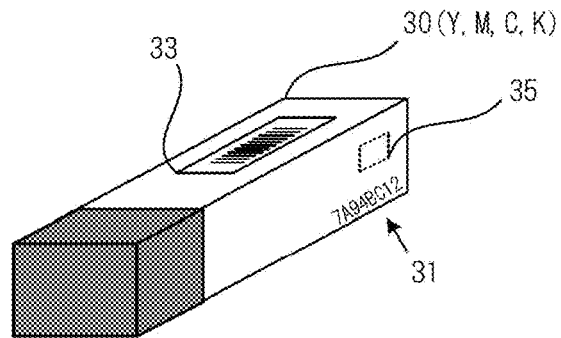
FIGS. 3A to 3C are views for explaining a method of providing supplies-specific information.

The supplies-specific information (serial number) of the supplies according to this embodiment can be configured as character information in which numbers, alphanumeric characters and the like are combined. The supplies-specific information configured as the character information may be directly affixed to the supplies 30 (Y, M, C, K) as character information 31 (7A94BC12, for example), as shown in FIG. 3A, for example. The character information may be converted into an identification code 33 (one-dimensional barcode or a two-dimensional code (QR code (registered trademark), SP code, PDF417 and the like, for example), for example) or stored in an IC chip 35 or a magnetic medium. It is also possible to attach any one or all of the character information 31, the identification code 33, and the IC chip 35 representing the supplies-specific information to a packing material 37 containing the supplies 30 shown in FIG. 3B or to a document 39 (FIG. 3C) enclosed when the supplies 30 are purchased.

Figure 3B:
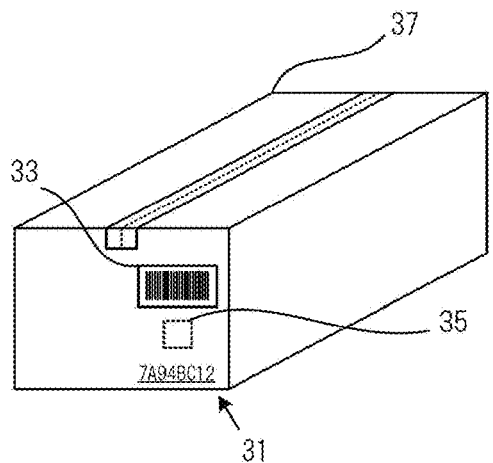
Figure 3C:
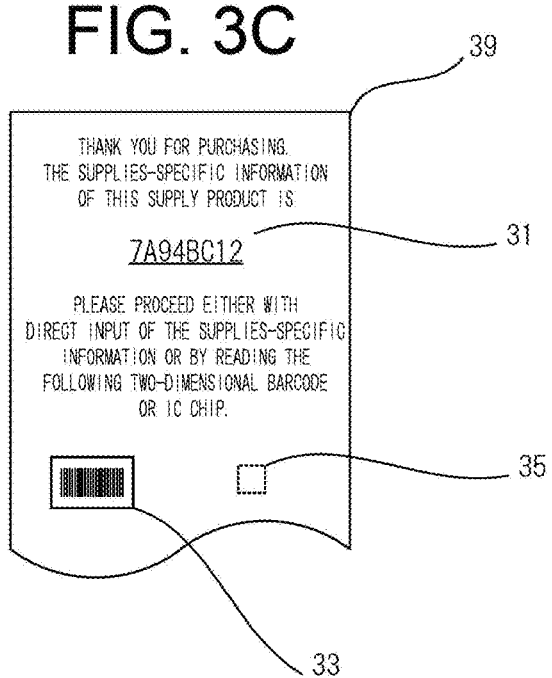

In the form shown in FIGS. 3A to 3C, it is preferable that the supplies-specific information is masked with a scratch-type protective seal, or the supplies-specific information is attached to a spot that cannot be seen without opening the packing material, for example, so that only the user who has newly purchased the supplies can know the information first. As a result, when a third party has registered the supplies-specific information intentionally or negligently before the user who has legitimately purchased the supplies, the user who has legitimately purchased the supplies can avoid suffering a disadvantage such as not being able to use the image forming apparatus 10 with the supplies attached.

By the way, it is preferable that the supplies-specific information according to this embodiment is not a simple sequential number, but character information with moderately missing numbers is employed in order to avoid matching by guesswork. Here, if the supplies-specific information is a 10-digit serial number using only numbers from 0 to 9 (10 ways), $10^{10}=10$ billion combinations can be obtained. Then, even if the serial number concerned is set to be valid at a ratio of only one out of 1000 ways, 10 million valid serial numbers can be set (example: 7894561230).

Similarly, if the supplies-specific information is an 8-digit serial number using the numbers 0-9 and the alphabets A-Z (36 ways), $36^8=2.8211$ trillion combinations can be obtained. Then, even if the serial number concerned is set to be valid at a ratio of only one out of 10000 ways, 280 million valid serial numbers can be set (example: 7A94BC12). In addition to numbers and alphabets, symbols such as $, +, −, and %, control characters and the like can be included in the character types that make up the supplies-specific information. By including such character types in the supplies-specific information, the supplies-specific information according to this embodiment can be applied to barcodes of standards equivalent to CODE39, CODE128 and the like, in addition to the JAN and ITF standards that correspond only to numerals, for example. In this embodiment, for convenience of explanation, "7A94BC12", which is the character information combining alphanumeric characters, is used as an example as supplies-specific information.

Then, the controller 11 acquires the supplies-specific information set by the above standard by controlling any one of the image reader 131, the information reader 133, and the inputter 135.

The storage 21 stores various programs and various types of data necessary for the operation of the image forming apparatus 10. The storage 21 can be constituted by, for example, a SSD (Solid state device) which is a semiconductor memory, a HDD (Hard disk drive) or the like.

In this embodiment, the storage 21 stores the application-code information generation program 211, the supplies-specific information acquisition program 213, the authentication-information generation program 215, and the apparatus use-permission determination program 217, and secures an apparatus-specific information storage area 219.

The application-code information generation program 211 is a program that is read by the controller 11 when generating application code information for applying for apparatus use permission of the image forming apparatus 10.

The supplies-specific information acquisition program 213 is a program that is read by the controller 11 when acquiring the supplies-specific information via the acquirer 13 having the image reader 131, the information reader 133, or the inputter 135.

The authentication-information generation program 215 is a program that is read by the controller 11 when generating or acquiring a one-time code (random alphanumeric characters having a predetermined number of digits) as authentication information contained in the application code information.

The apparatus use-permission determination program 217 is a program that is read by the controller 11 when an application permission code that permits use of the image forming apparatus 10 is received from an application server device or a service center described below. The controller 11 determines the received application permission code. When the received application permission code is a legitimate code, the controller 11 lifts the apparatus use restriction.

The apparatus-specific information storage area 219 is an area for storing the apparatus-specific information that is individually assigned to the image forming apparatus 10 and used for generating the application code information. The apparatus-specific information is configured as character information combining numbers or alphanumeric characters and the like, and is an identification number uniquely assigned by the distributor of the image forming apparatus. In this embodiment, for convenience of explanation, "MFP-012345-abcd-6789", which is character information combining alphanumeric characters, is used as an example of an apparatus identification number.

1.3 Flow of Processing

Referring to FIGS. 4 and 5, the processing of generating the application code information by the image forming apparatus 10 will be described.

First, the controller 11 acquires the supplies-specific information input via any one of the image reader 131, the information reader 133, and the inputter 135 (step S10). Here, the acquisition processing of the supplies-specific information via any one of the image reader 131, the information reader 133, and the inputter 135 will be described using FIGS. 5A to 5C.

Figure 5C:
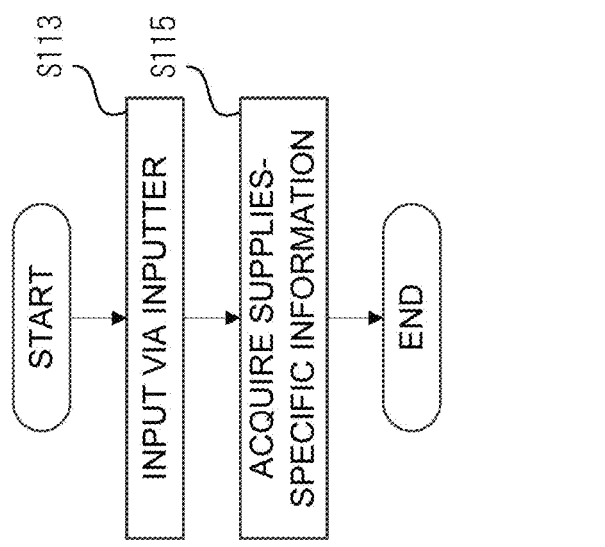
FIGS. 5A to 5C are flowcharts for explaining a process of generating the application information in the first embodiment.
Figure 5B:
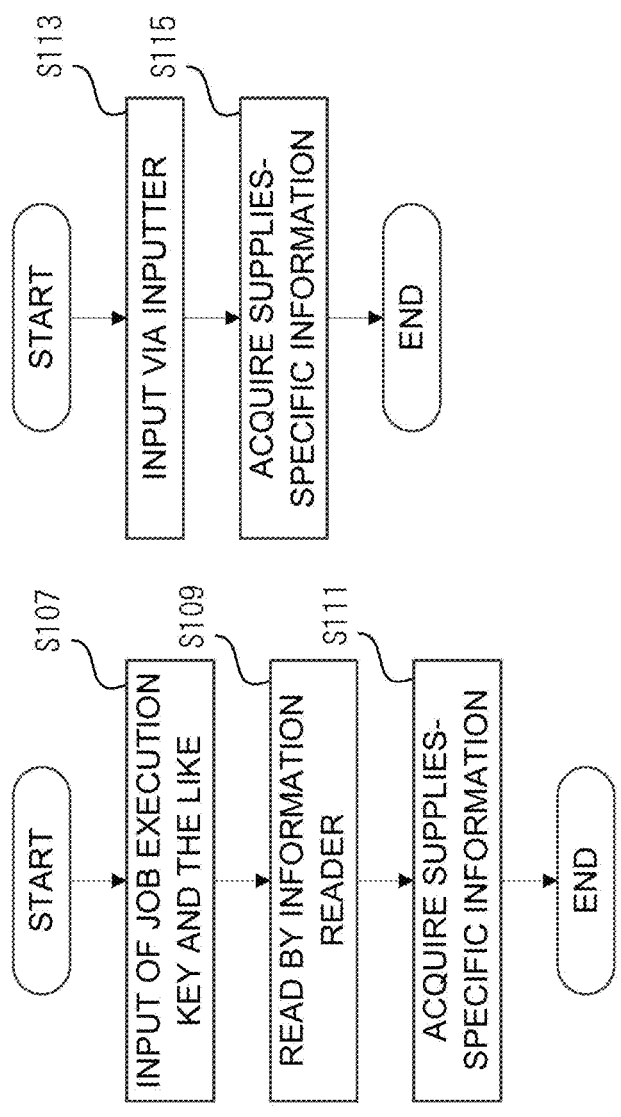
Figure 5A:
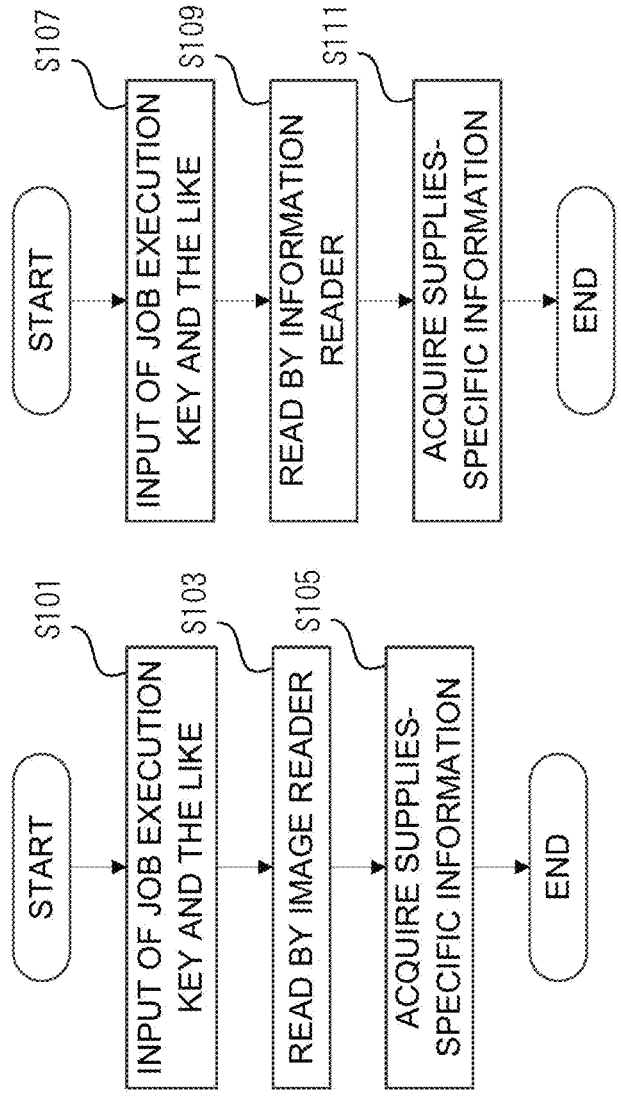

First, the acquisition processing of the supplies-specific information via the image reader 131 is described using FIG. 5A. When a job execution signal is input by the image reader 131, such as pressing of a job execution key, not shown, or a change in an open/closed state of the manuscript holding member 131a, the controller 11 reads the supplies-specific information acquisition program 213 (step S101).

Next, the image reader 131 reads the supplies-specific information such as character information 31, identification code 33 and the like attached to the document 39 and the like placed on the document loading stand 131b, for example (step S103).

The controller 11 acquires the supplies-specific information read at step S103 from the image reader 131 (step S105). It is to be noted that the controller 11 can acquire the supplies-specific information by executing OCR (Optical character recognition) processing to the images read by the image reader 131 or reading two-dimensional codes such as QR codes and bar codes.

The image forming apparatus 10 according to this embodiment originally includes an image reader for a copy function and the like and can acquire the supplies-specific information without adding special hardware.

Next, the acquisition processing of the supplies-specific information via the information reader 133 is described using FIG. 5B. When the job execution signal is input by the information reader 133, such as pressing of the job execution key or a change in a proximity or contact state of an IC chip with respect to an IC card reader, an NFC reader, or a magnetic reader, the controller 11 reads the supplies-specific information acquisition program 213 ((step S107).

Next, the information reader 133 reads the supplies-specific information from the IC chip 35 or the like attached to the supplies 30 (Y, M, C, K), the packing material 37, the document 39 or the like (step S109), for example.

The controller 11 acquires the supplies-specific information read at step S109 from the information, reader 133 (step S111).

The image forming apparatus 10 according to this embodiment originally includes the information reader 133 for user management, security measures and the like, and can acquire the supplies-specific information without adding special hardware. In addition, as compared with the case where the supplies-specific information is represented by the character information 31, the identification code 33 and the like, the IC chip 35 is more difficult to be duplicated, so that inappropriate use can be suppressed.

Lastly, the acquisition processing of the supplies-specific information via the inputter 135 is described using FIG. 5C. When the character information 31 representing the supplies-specific information attached to the supplies 30 (Y, M, C, K), the packing material 37, the document 39 or the like is input to the inputter 135 by the user, the controller 11 reads the supplies-specific information acquisition program 213 (step S113).

The controller 11 acquires the supplies-specific information input at step S113 from the inputter 135 (step S115).

Since the input of the supplies-specific information via the inputter 135 is directly input by the user, it does not need to correspond to the image reader 131 or the information reader 133, and the supplies-specific information does not necessarily need to be attached to/enclosed with the supplies. In addition, since the supplies-specific information does not become bulky like the cards or recording media on which the supplies-specific information is recorded or written, it can be stored and managed in a safe or the like separately from the supplies.

Returning again to FIG. 4, the controller 11, which has acquired the supplies-specific information, reads the apparatus-specific information of the image forming apparatus 10 from the apparatus-specific information storage area 219 (step S20).

At step S30, the controller 11 reads the application-code information generation program 211 and the authentication-information generation program 215. The controller 11 generates a one-time code by reading the authentication-information generation program 215. The controller 11 generates application code information from the generated one-time code, the supplies-specific information (7A94BC12) acquired at step S10, and the apparatus-specific information (MFP-01234-abcd-6789) read at step 20 (Step S30).

In the explanation of this embodiment, "7A94BC12*MFP-01234-abcd-6789*OC", which combines the character information "OC" as an example of the one-time code with the application code information consisting of the supplies-specific information and the apparatus-specific information, is used as an example of the application code information. It is to be noted that the application code information is not limited to such character information, and the one obtained by encrypting the character information may be used as the application code information. Here, the one-time code is information that is generated within the image forming apparatus 10 at the time of generation of the application code information and is incorporated into the application code information. The one-time code is information that, when combined with the application code information, should be reflected in an application permission code that permits use of the apparatus, and when the controller 11 receives the application permission code, the one-time code enables determination on whether it matches the one-time code the image forming apparatus 10 last issued (the most recently issued, the most newly issued in those issued the past).

If there is no one-time code, the application permission code used in the past can be used again and again at any time. Here, it is possible to store the application permission code received in the past, and to prevent reuse of the used application permission code by comparing it with the stored application permission code, but a method of storing the application permission code received in the past is not desirable because it can be avoided by setting an apparatus main body or resetting the memory At step S40, the controller 11 transmits the generated application code information to the application server device or the service center via the communicator 17.

Finally, the controller 11 imposes use restrictions on some functions related to the image forming operation of the image former 19 and the for example, and ends the processing (step S50).

Next, the processing of the controller 11 in the case where the application permission code permitting use of the apparatus is received in response to the application code information transmitted at step S40 in FIG. 4 will be described using FIG. 6.

First, the controller 11 receives the application permission code via the communicator 17 (step S60). Upon receiving the application permission code, the controller 11 reads the apparatus use-permission determination program 217.

Here, the application permission code may be accepted from the application server device or the service center that undertakes the application for apparatus use permission via online or offline such as by mail, fax communication, or e-mail.

If the application permission code is received online, the controller 11 executes the processing at step S70 as it is. On the other hand, when the application permission code is received offline, the user may need to input character information of the application permission code via the inputter 135 or, if the application permission code is represented by an identification code such as a one-dimensional barcode or a two-dimensional code or the like, input processing via the information reader 133 may be needed.

At step S70, the controller 11 determines whether the application permission code is valid or not. When determining whether the application permission code is valid or not, the controller 11 makes determination by collating the one-time code in the application permission code against the one-time code stored in the storage 21.

The controller 11 may also determine validity of the application permission code using other determination factors other than the one-time code, such as whether or not the received application permission code contains all or a part of the application code information transmitted by itself, whether or not it contains a keyword or the like indicating that the application is permitted, and the like.

When the controller 11 determines that the application permission code is a legitimate application permission code and is valid (step S70; Yes), the controller 11 lifts the apparatus use restriction applied at step S50 in FIG. 4 and enables the apparatus (step S80).

On the other hand, if it is determined that the application permission code is not a legitimate application permission code and is not valid (step S70; No), the controller 11 repeats the processing until it is determined that the application permission code is a legitimate application permission code and is valid.

By the way, the application permission code may be accompanied by usage limit information that specifies a usable amount in the image forming apparatus 10.

Here, as illustrated in a table in FIG. 7, the usage limit information specifies the usable amount, including the number of various printing sheets (print, copy, fax and the like, for example) that at least consume/wear out the supplies, and a charged money amount varies in accordance with the usage limit information. For example, if the number of sheets printed is ~100, the charged money amount is 1000 yen. In this case, the usage limit information "AA" is attached to the application permit code. It is to be noted that the usage limit information may include usage limits pertaining to the image reading function, the transmission function and the like.

For example, when the controller 11 receives the application permission information to which the usage limit information is attached, it is also possible to set the usable amount specified by the usage limit information to the image forming apparatus 10 at step S80 in which the apparatus use restriction is lifted and the apparatus is enabled.

1.4 Operation Example

Figure 8A:
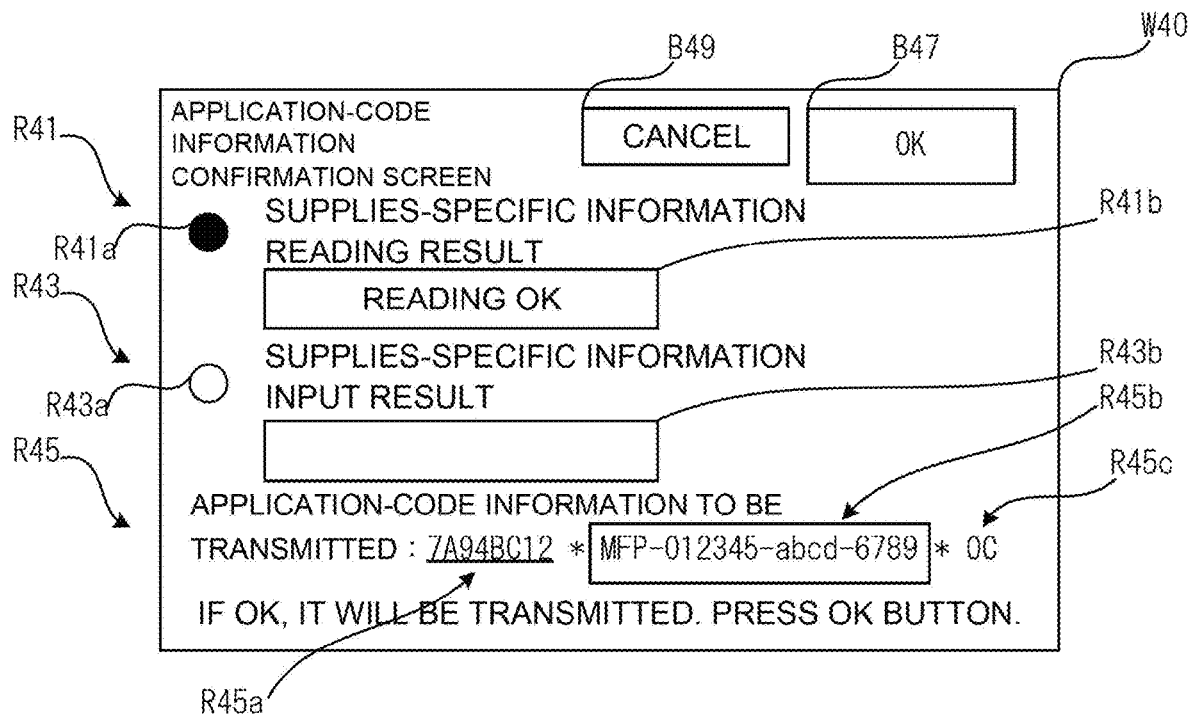
FIGS. 8A and 8B are diagrams for explaining an operation example in the first embodiment.
Figure 8B:
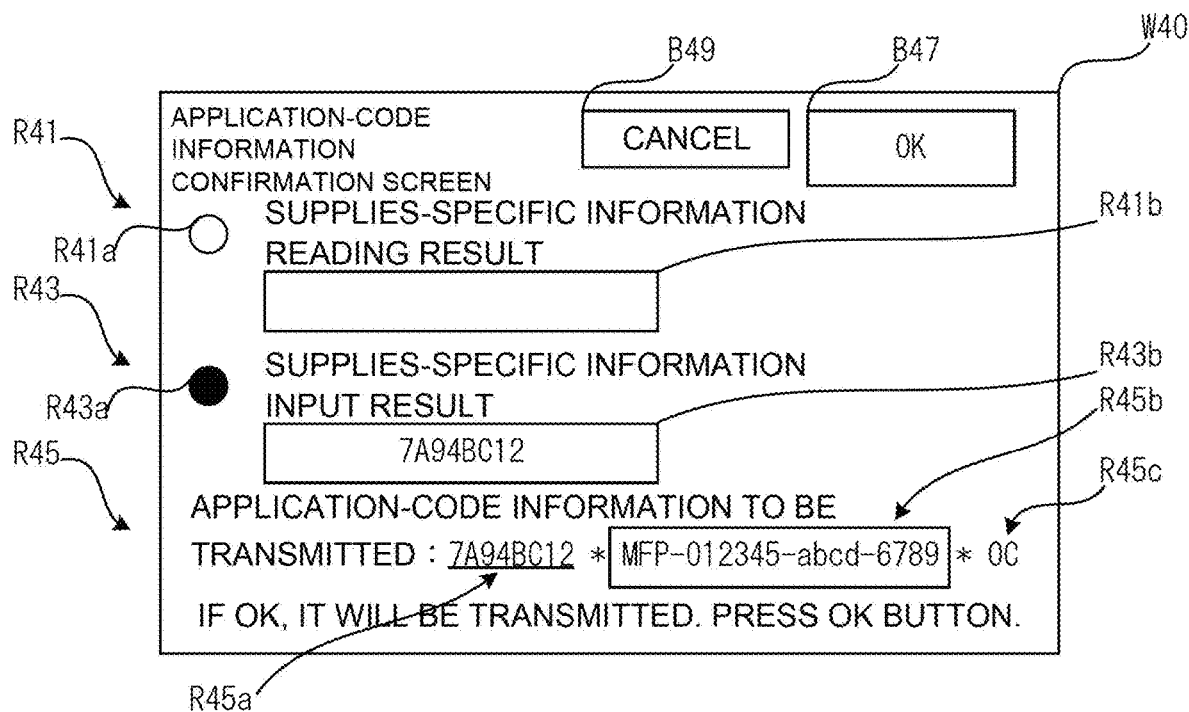

An operation example of this embodiment will be described with reference to FIGS. 8A and 8B. FIGS. 8A and 8B are a diagram for explaining a configuration example of a display screen when the controller 11 displays, via the display 15, the generated application code information. It is to he noted that FIGS. 8A and 8B show an example of the application-code information confirmation screen when the image forming apparatus 10 is connected to a network or the like, and the application code information is transmitted online.

FIG. 8A shows an example of a case where the supplies-specific information is acquired via the image reader 131 or the information reader 133 at step S10 in FIG. 4 (step S105 or step S111 in FIGS. 5A to 5C). FIG. 8B shows an example of a case where the supplies-specific information is acquired by direct input via the putter 135 at, step S10 in FIG. 4 (step S115 in FIGS. 5A to 5C) as well.

The application-code information confirmation screen W40 according to this embodiment includes a supplies-specific information reading-result display area R41, a supplies-specific information input-result display area R43, an application-code information display area R45, an OK button B47 and a cancel button B49.

The supplies-specific information reading-result display area R41 is a display area where the reading result is displayed when the supplies-specific information is read by the image reader 131 or the information reader 133. Specifically, when the supplies-specific information is read by the image reader 131 or the information reader 133, the controller 11 activates a radio button R41a and causes the reading result ("Reading OK" and the like, for example) displayed in a display box R41b.

The supplies-specific information input result display area R43 is a display area in which the input result is displayed when the supplies-specific information is directly input by the user via the inputter 135. Specifically, when the supplies-specific information is input by the user via the inputter 135, the controller 11 activates the radio button R43a and causes the input result ("7A94BC12" and the like, for example) displayed in the display box R43b.

The application-code information display area R45 is a display area in which the application code information generated by the controller 11 is displayed. In the application-code information display area R45 according to this embodiment, a configuration example of the application code information consisting of a combination of supplies-specific information R45a, apparatus-specific information R45b, and R-authentication information 45c is displayed.

The OK button B47 is an input button to accept a transmission instruction of the application code information by the user, and the cancel button B49 is an input button to accept cancellation of transmission of the application code information by the user.

The user confirms the items displayed on the application-code information confirmation screen W40 and presses the OK button B47 so that the application code information can be reliably sent.

As described above, according to this embodiment, it is configured such that the application code information is generated and transmitted by the controller 11 by associating the apparatus-specific information for identifying the image forming apparatus 10 to the supplies-specific information acquired via the image reader 131, the information reader 133, or the inputter 135 and thus, the procedure for applying for apparatus use permission, which involves determination on the recommended supplies, can be performed reliably without bothering the user.

By the way, as described above, the supplies-specific information (code) is necessary to indicate the suitability and characteristics of supplies. However, if no measures are taken to prevent inappropriate use of the supplies-specific information, the information can be reused for different supplies by duplicating it.

In order to prevent such inappropriate use, such a system is known, for example, in which an image forming apparatus main body stores supplies-specific information pertaining to supplies that have been used in the past, and use of the apparatus is permitted on a condition that there is no history of the past use of the same main body.

However, if the duplicated supplies-specific information is used for an image forming apparatus that has no history of using the supplies corresponding to the supplies-specific information in the past, the image forming apparatus may recognize that the duplicated supplies-specific information is valid and permit the use of the apparatus.

Thus, such a system can be conceived that the supplies-specific information or the like is left as a history in an external device such as an application server device or an external organization such as a support center, and the supplies-specific information contained in the received application information is collated against the history if it is determined that the supplies-specific information pertaining to the application is not included in the history, the operator of the application server device or the service center issues use permission information (code) that permits the use of the apparatus.

However, the use permission information (code) issued by the above system can be used for any image forming apparatus because the image forming apparatus that uses the supplies is not identified. In this embodiment, by generating the application code information by associating the supplies-specific information and the apparatus-specific information of the image forming apparatus as the application code information, the use permission information (code) that, cannot be used in other image forming apparatuses can be issued.

It is to be noted that the same use permission information (code) might be used again for the same image forming apparatus by initializing a storage device of the image forming apparatus to which the use permission information (code) was applied in the past in some cases. In order to prevent this, in this embodiment, authentication information such as a one-time code is generated in the image forming apparatus and added to the application code information, so that the operator of the application server device or the service center can generate the use permission information (code) corresponding to the one-time code. As a result, reuse of the use permission information (code) due to initialization of the storage device of the image forming apparatus main body or the like can be prevented.

2. Second Embodiment

Figure 9:
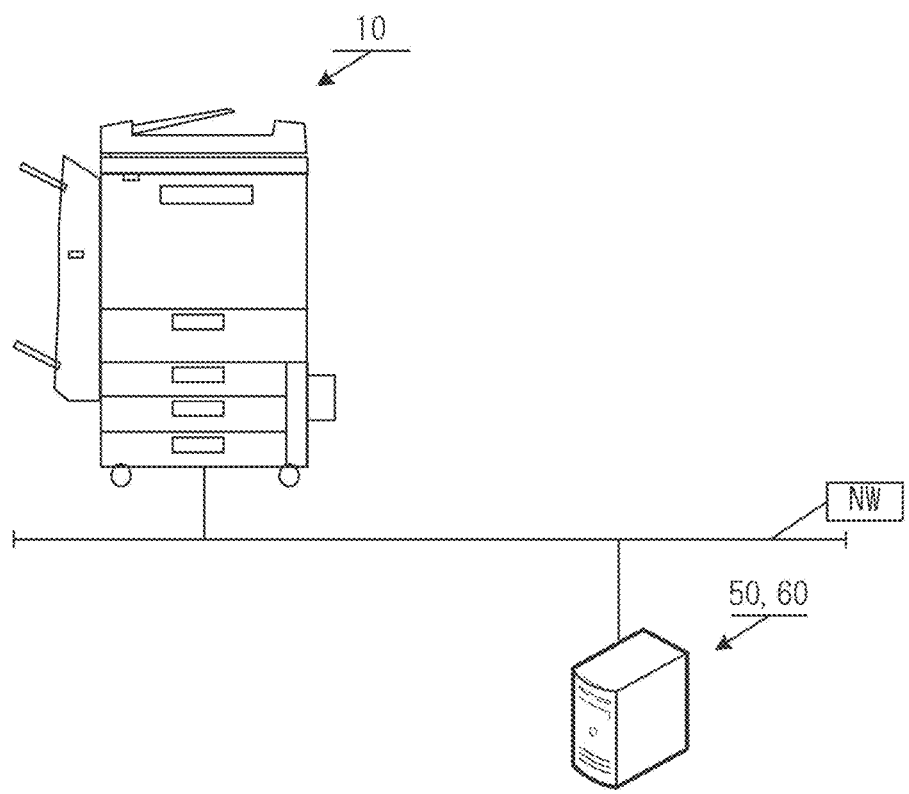
FIG. 9 is a diagram for explaining a network configuration in a second embodiment.

Next, a second embodiment will be described. The second embodiment, as shown in FIG. 9, is an embodiment where the image forming apparatus 10 is directly connected to a network NW and can send/receive information online to/from application server devices 50, 60 and the like.

2-1. Application Server Device

Figure 10:
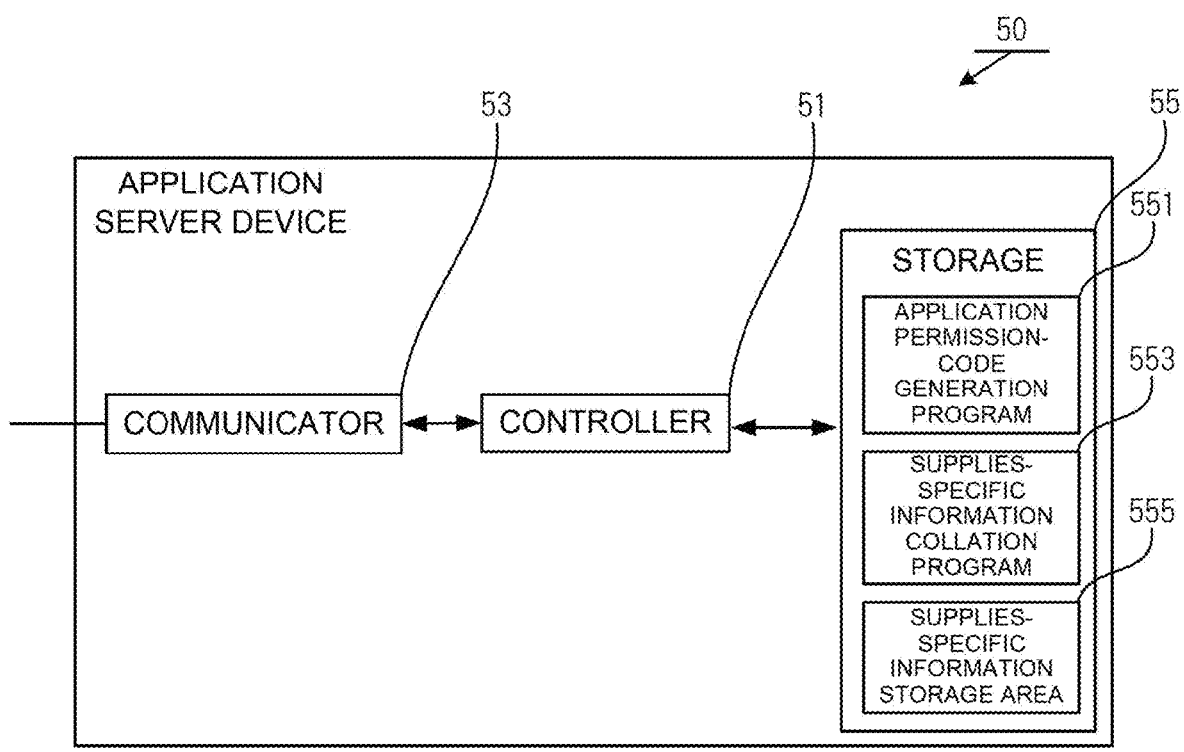
FIG. 10 is a functional configuration diagram of an application server device in the second embodiment.

FIG. 10 is a functional configuration diagram of an application server device 50 according to this embodiment. As shown in FIG. 10, the application server device 50 has a controller 51 as a controller or a second controller, a communicator 53 as a communicator, and a storage 55 as a storage or a second storage.

The controller 51 controls the entire application server device 50. The controller 51 is constituted by one or a plurality of arithmetic devices (CPU, for example) and the like, and realizes various functions by reading and executing various programs stored in the storage 55. In this embodiment, the controller 51 realizes each function by reading and executing an application permission-code generation program 551 and a supplies-specific information collation program 553 described below.

The communicator 53 is connected to devices via the network and sends/receives various types of information. The communicator 53 is configured as a communicable interface, for example, and may employ either one of or both of wired/wireless as a connection method.

The storage 55 stores various programs and various types of data necessary for the operation of the application server device 50. The storage 55 can be configured by, for example, an SSD which is a semiconductor memory, an HDD or the like.

In this embodiment, the storage 55 stores the application permission-code generation program 551 and the supplies-specific information collation program 553, and secures the supplies-specific information storage area 555.

The application permission-code generation program 551 is a program that is read by the controller 51 when generating an application permission code that permits apparatus use of the image forming apparatus 10 from the application code information received from the image forming apparatus 10 via the communicator 53.

The supplies-specific information collation program 553 is a program that is real by the controller 51 when the controller 51 collates the supplies-specific information contained in the received application code information against the supplies-specific information stored in the supplies-specific information storage area 555 so as to determine whether the supplies-specific information is unregistered or not.

The supplies-specific information storage area 555 is an area for storing the supplies-specific information received in the past as a supplies-specific information storage table.

Figure 11:
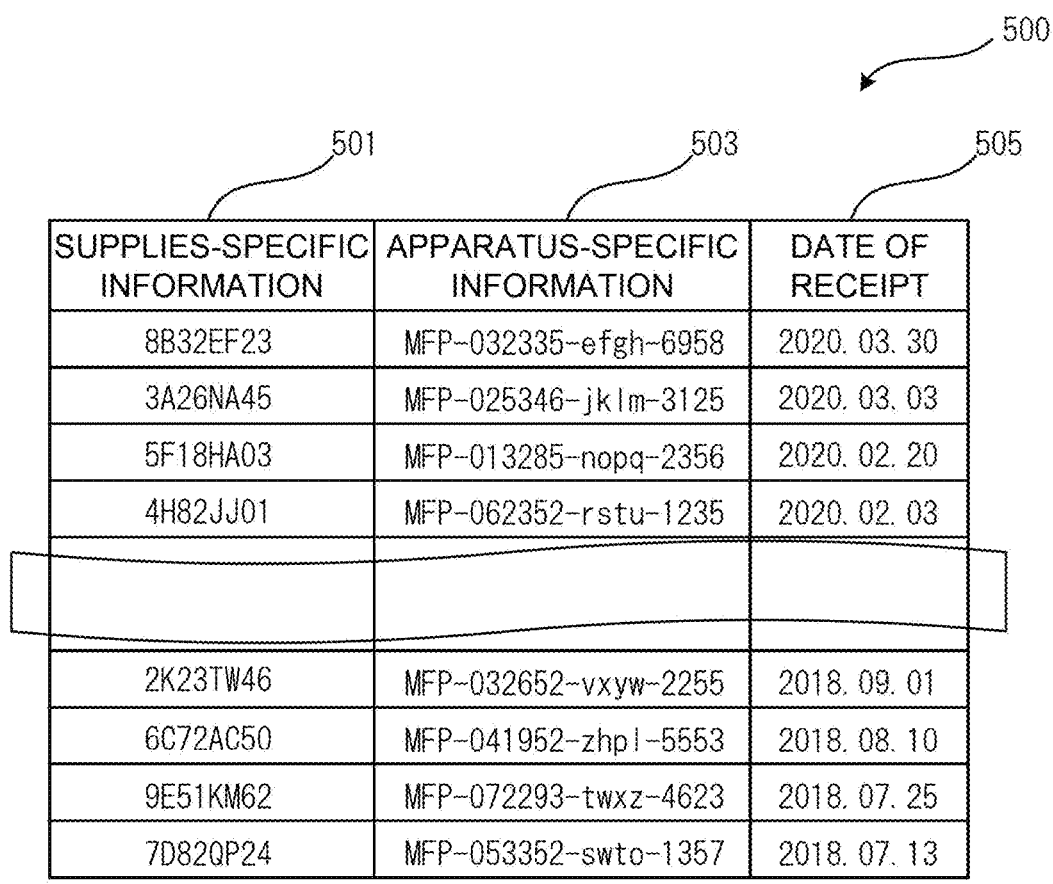
FIG. 11 is a diagram for explaining a configuration example of a table storing supplies-specific information in the second embodiment.

FIG. 11 is a diagram for explaining a configuration example of the supplies-specific information storage table 500 stored in the supplies-specific information storage area 555.

The supplies-specific information storage table 500 according to this embodiment includes supplies-specific information 501, apparatus-specific information 503, and a date of receipt 505.

The supplies-specific information 501 and the apparatus-specific information 503 are information contained in the application code information received from the image forming apparatus 10. In order to identify the image forming apparatus 10 to which the supplies pertaining to the supplies-specific information are attached, the supplies-specific information ("8B32EF23", for example) and the apparatus-specific information ("MFP-032335-efgh-6958", for example) are associated and stored in a phase direction.

The date of receipt 505 is the date on which the application server device 50 received the application code information. Although such a state that even time of receipt of the application code information is required is hardly assumed, if there is room in the storage area, the time of receipt may be stored in addition to the date of receipt.

The controller 51 of the application server device 50 determines whether the image forming apparatus to which the application code information is sent may be used or not by using the supplies-specific information storage table 500. The generation processing of an application permission code executed by the application server device 50 will be described using FIG. 12.

The controller 51 receives the application code information from the image forming apparatus 10 via the communicator 53 (step S110). The controller 51 reads the supplies-specific information collation program 553. The controller 51 determines whether the supplies-specific information is unregistered or not by collating the supplies-specific information contained in the received application code information against the supplies-specific information stored in the supplies-specific information storage table 500.

For example, if the received application code information is "7A94BC12*MFP-012345-abcd-6789*OC" as illustrated in FIGS. 8A and 8B and the like, the controller 51 authenticates the application code information with the one-time code (OC) contained in the received application code information and collates the supplies-specific information ("7A94BC12") contained in the application code information against the supplies-specific information stored in the supplies-specific information storage table 500. In this case, the supplies-specific information ("7A94BC12") contained in the application code information is not yet stored in the supplies-specific information storage table 500. Therefore, the controller 51 can determine that the supplies-specific information is unregistered in the supplies-specific information storage table 500.

In this case, the controller 51 identifies the image forming apparatus 10 that generated the application code information by the one-time code (OC) contained in the received application code information, but if it is determined that the supplies-specific information is unregistered (step S130; Yes), the controller 51 causes the supplies-specific information, the apparatus-specific information associated with the supplies-specific information, and the date of receipt to be stored in the supplies-specific information 501, the apparatus-specific information 503, and the date of receipt 505 of the supplies-specific information storage table 500, respectively (step S140).

On the other hand, if it is determined that the supplies-specific information is not unregistered (step S130; No), the controller 51 ends the series of processing.

At step S150, the controller 51 reads the application permission-code generation program 551 and generates an application permission code that permits use of the apparatus. In this embodiment, for convenience of explanation, it is assumed that the controller 51 generates "RA-7A94BC12*MFP-01234-abcd-6789*OC*AA" by combining "RA (Request approval)", which represents the permission to use the image forming apparatus 10, "7A94BC12*MFP-01234-abcd-6789*OC", which is a main body of the application code information and the usage limit information. In this case, the controller 51 generates the application permission code without making any changes to the one-time code. It is to be noted that the application permission code is not limited to such character information, and the one obtained by encrypting the character information may be used as the application permission code.

Then, the controller 51 transmits the generated application permission code to the image forming apparatus 10 that is the sender of the application code information (step S160), and ends the series of processing.

As described above, since the image forming apparatus 10 is connected online with the application server device 50 that generates the application permission code, the user's time and labor involved in applying to the application server device 50 and the like can be saved.

2-2. Application Server Device with Settlement Function

The application server device 60 with a settlement function is an application server device in which the settlement function is added to the application server device 50 described above to execute settlement processing in accordance with the usage limit information (usable amount).

The settlement processing in this embodiment means online settlement processing for the charged money amount according to the usage limit information, and the online settlement processing includes, for example, various settlement methods such as credit card settlement, bank settlement, carrier settlement, electronic money settlement, ID settlement, or convenience store settlement.

Figure 13:
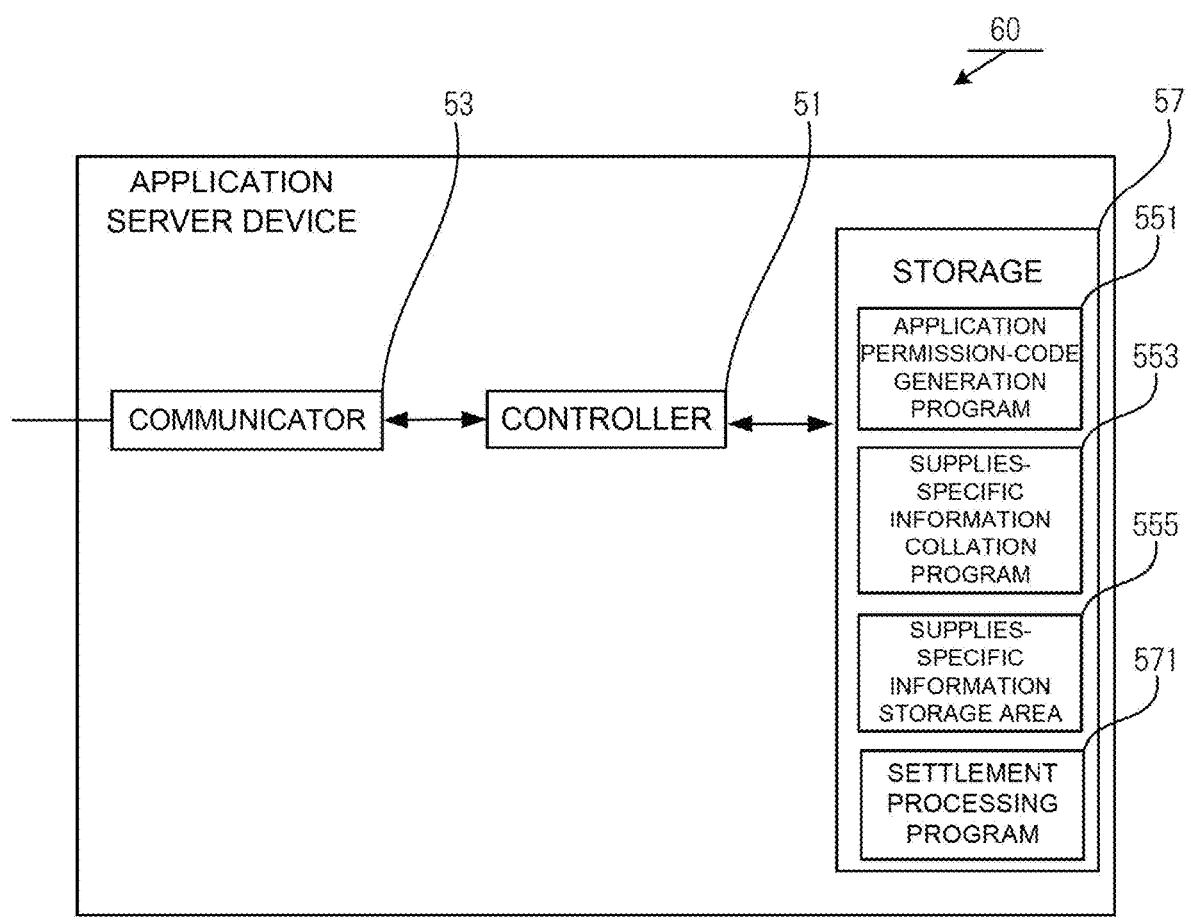
FIG. 13 is a functional configuration diagram of another application server device in the second embodiment.

FIG. 13 is a functional configuration diagram of the application server device 60 with the settlement function. It is to be noted that the same functional configuration as that of the application server device 50 described above is given the same sign, and the description thereof is omitted.

The application server device 60 with the settlement function has a storage 57 in place of the storage 55 included in the application server device 50. The storage 57 stores the application permission-code generation program 551, the supplies-specific information collation program 553, and the settlement processing program 571, and secures the supplies-specific information storage area 555.

The settlement processing program 571 is a program that is read by the controller 51 when the settlement processing is executed for the charged money amount in accordance with the usage limit information.

Figure 12:
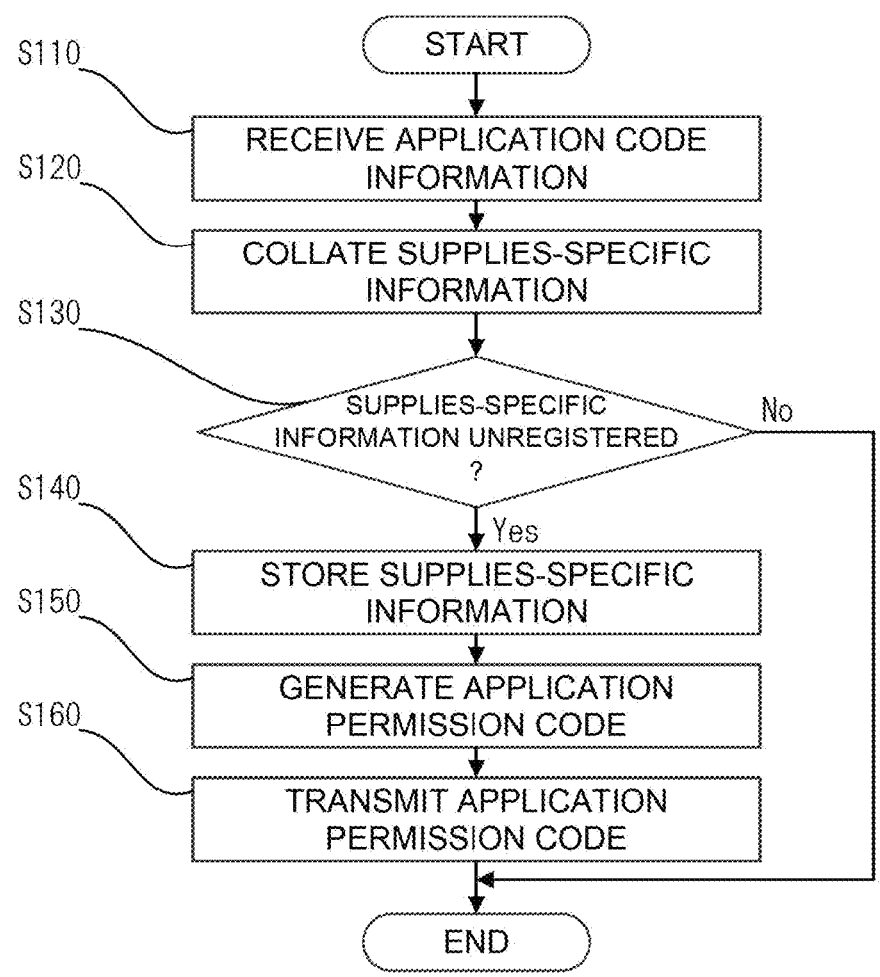
FIG. 12 is a flowchart for explaining a process of generating an application permission code in the second embodiment.
Figure 14:
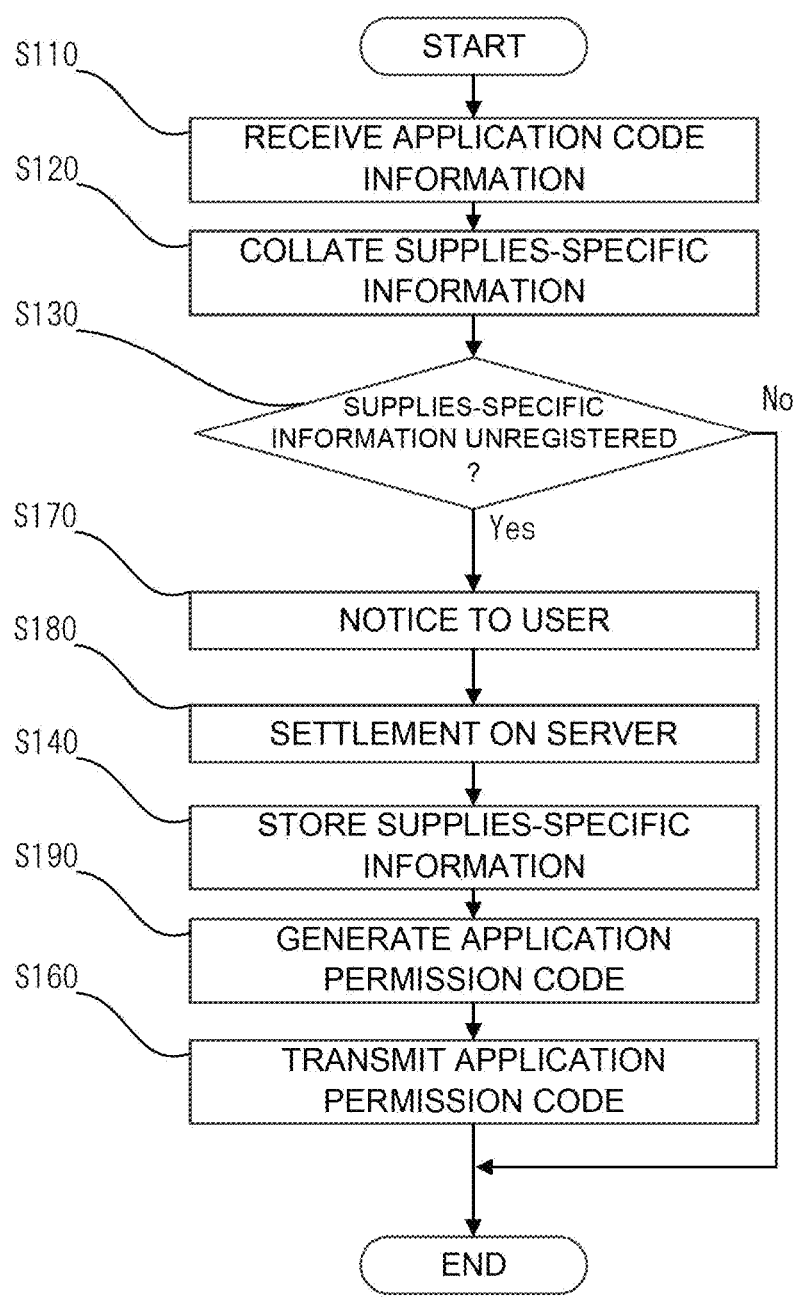
FIG. 14 is a flowchart for explaining the process of generating the application permission code by another application server device of the second embodiment.

The generation processing of the application permission code executed by the application server device 60 with the settlement function will be described using FIG. 14. It is to be noted that the same processing as that of the application server device 50 in FIG. 12 is given the same step number and explanation thereof is omitted.

When the controller 51 determines that the supplies-specific information is unregistered after receiving the application code information (step S130; Yes), the controller 51 notifies the user of the charged money amount according to the usage limit information attached to the application permission code, and prompts the user to execute online settlement processing for the charged money amount (step S170).

When the user who receives the notification replies that he or she will execute the settlement processing online, the controller 51 reads the settlement processing program 571.

The user executes the settlement processing online (step S180). It is to be noted that, in the settlement processing at this step, the user may execute the settlement processing pertaining to the change of the charged money amount according to the usage limit information illustrated in FIG. 7, that is, the change of the usable amount.

When the settlement processing on the server is completed, the controller 51 stores the supplies-specific information and the like in the supplies-specific in storage table 500 (step S140).

Then, the controller 51 reads the application permission-code generation program 551 and generates an application permission code with the usage limit information corresponding to the user's settlement processing (step S190). Lastly, the controller 51 transmits the generated application permission code to the image forming apparatus 10 that is the sender of the application code information (step S160), and ends the series of processing.

By adding the settlement function to the application server device, a price of the supplies themselves and the fees associated with the use of the apparatus main body can be kept separate, for example. This prevents customers' disadvantages such that use is disabled when the number of sheets exceeds the expected standard number of sheets to be used, even though the actual average printing rate is low and the supplies are not exhausted.

3. Third Embodiment

Figure 15:
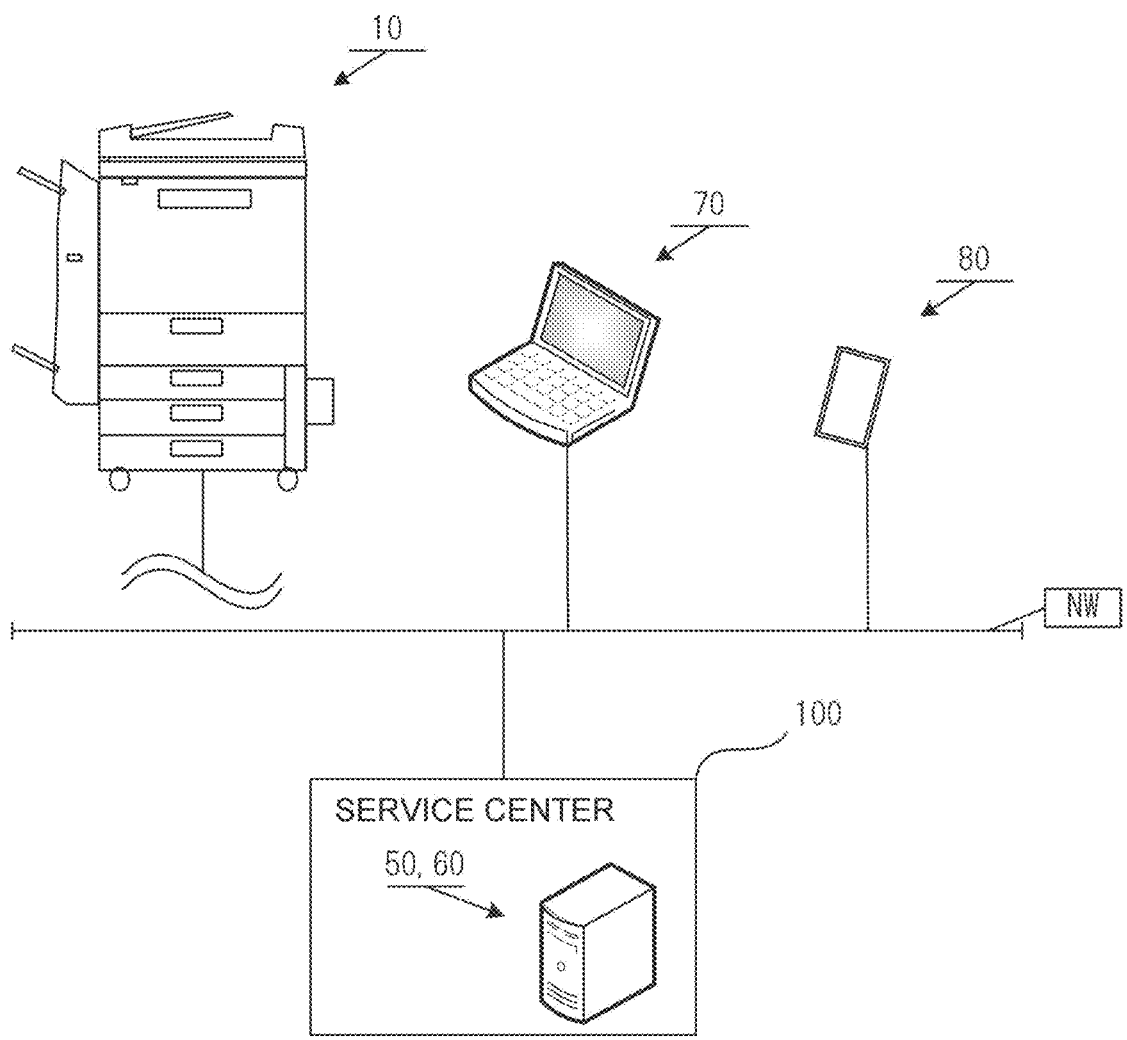
FIG. 15 is a diagram for explaining the network configuration in a third embodiment.

Next, a third embodiment will be described. The third embodiment unlike the second embodiment, an embodiment in which the image forming apparatus 10 is isolated from the network NW and online transmission/reception of the information with the application server devices 50, 60, and the like is impossible (offline) as illustrated in FIG. 15.

3-1. Print of Application Code Information

Figure 16:
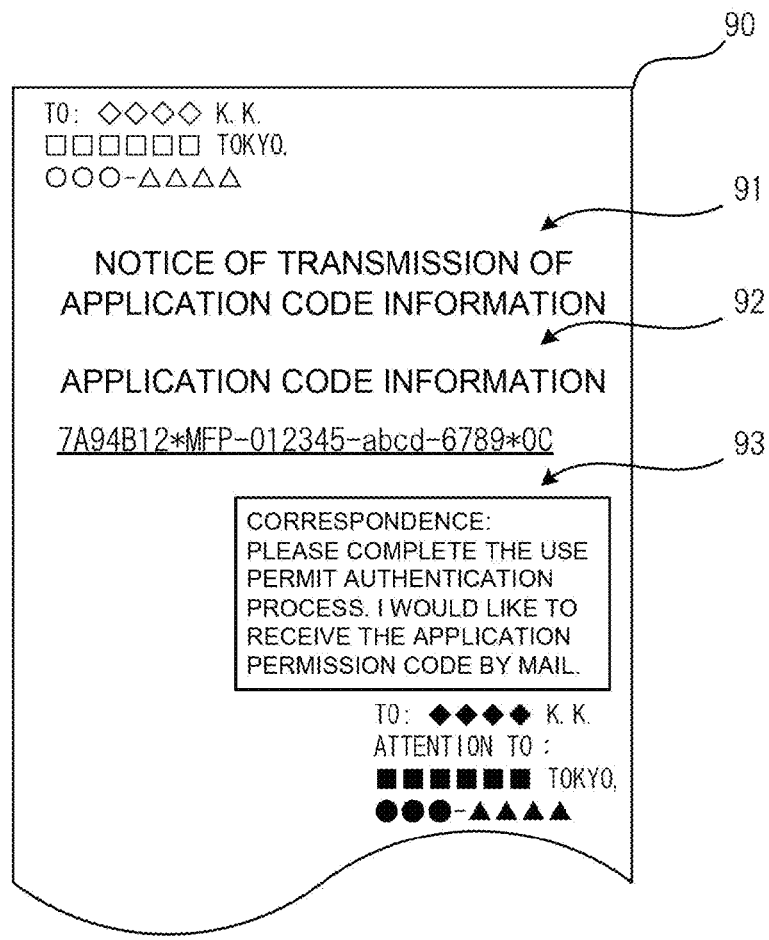
FIG. 16 is a diagram for explaining a configuration example of a document in a transmittal letter format in the third embodiment.

The image forming apparatus 10 includes the image former 19. Therefore, the application code information can be documented on a recording medium and printed. This makes it easy to acquire the application code information containing the supplies-specific information by using a mobile terminal device including a communication function and an image pickup function, for example. In addition, as illustrated in FIG. 16, for example, it is also possible to print the application code information as a document in a form of a transmittal letter 90 in which information such as a purpose 91 of transmission of the application code information, the application code information 92, necessary items (communication fields) 93 and the like is described so that mailing or fax transmission to the service center 100 can be facilitated.

Figure 17:
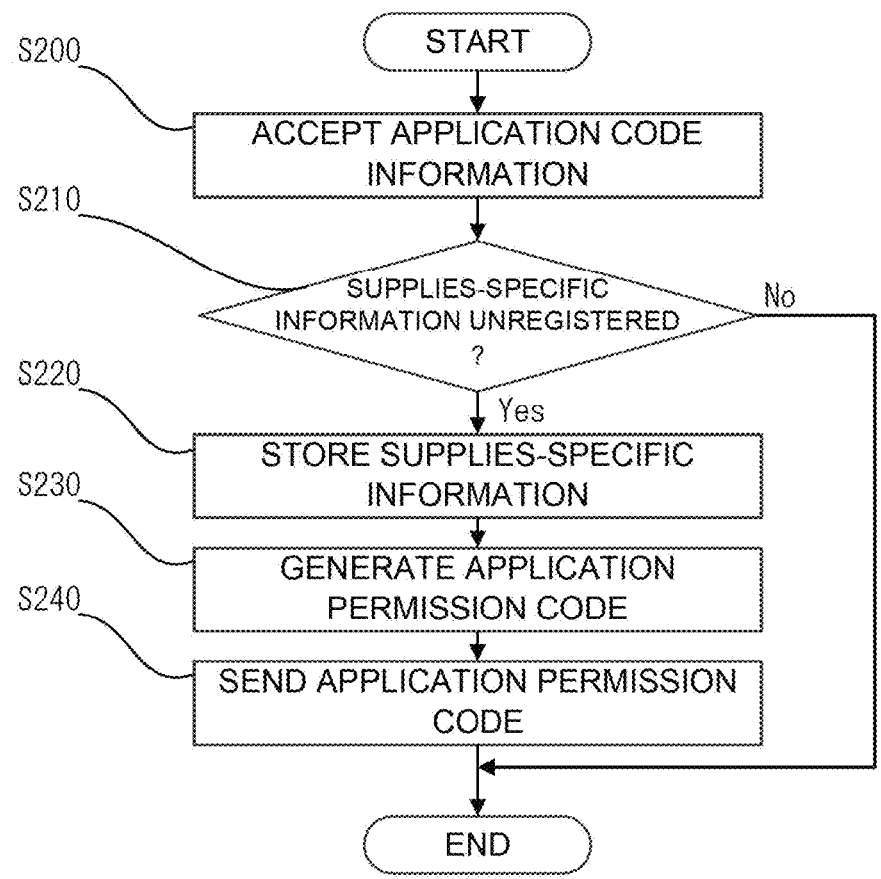
FIG. 17 is a flowchart for explaining the process of generating the application permission code in the third embodiment.

Here, the process in which a recording medium (transmittal letter 90) on which the application code information is printed is mailed or faxed or the like, and the operator of the service center 100 who accepts it processes it will be described using FIG. 17.

The operator accepts the application code information by mail, fax or the like (step S200). Next, the operator authenticates the application code information with the one-time code contained in the received application code information and collates the supplies-specific information against the supplies-specific information stored in the supplies-specific information storage table 500 of the application server devices 50 and 60 to determine whether the supplies-specific information is unregistered or not.

For example, when the received application code information is "7A94BC12*MFP-012345-abcd-6789*OC" as illustrated in FIGS. 8A and 8B and the like, the operator collates the supplies-specific information contained in the application code information ("7A94BC12") against the supplies-specific information stored in the supplies-specific information storage table 500. In this case, the supplies-specific information ("7A94BC12") contained in the application code information is not yet stored in the supplies-specific information storage table 500. Therefore, the operator can determine that the supplies-specific information is unregistered in the supplies-specific information storage table 500.

If it is determined that the supplies-specific information is unregistered (step S210; Yes), the operator stores the supplies-specific information, the apparatus-specific information associated with the supplies-specific information, and the date of receipt in the supplies-specific information 501, the apparatus-specific information 503, and the date of receipt 505 of the supplies-specific information storage table 500, respectively (step S220).

On the other hand, if it is determined that the supplies-specific information is not unused (step S210; No), the operator ends the series of processing.

At step S230, the operator generates an application permission code that permits use of the apparatus (step S230). Then, the operator sends the generated application permission code to the sender of the application code information (step S240) and ends the series of processing.

Of course, the determination processing of the supplies-specific information pertaining to step S210, the generation processing of the application permission code pertaining to step S230 and the like can be processing executed by the controller 51 of the application server devices 50 and 60 instead of processing by an operator.

3-2. Electronic File of Application Code Information

It is also possible to generate the application code information as an electronic file similarly to a form of printing the application code information on a recording medium. In this case, a function of generating an electronic file can be added to the configuration of the image forming apparatus 10 shown in FIG. 2. for example.

Figure 18:
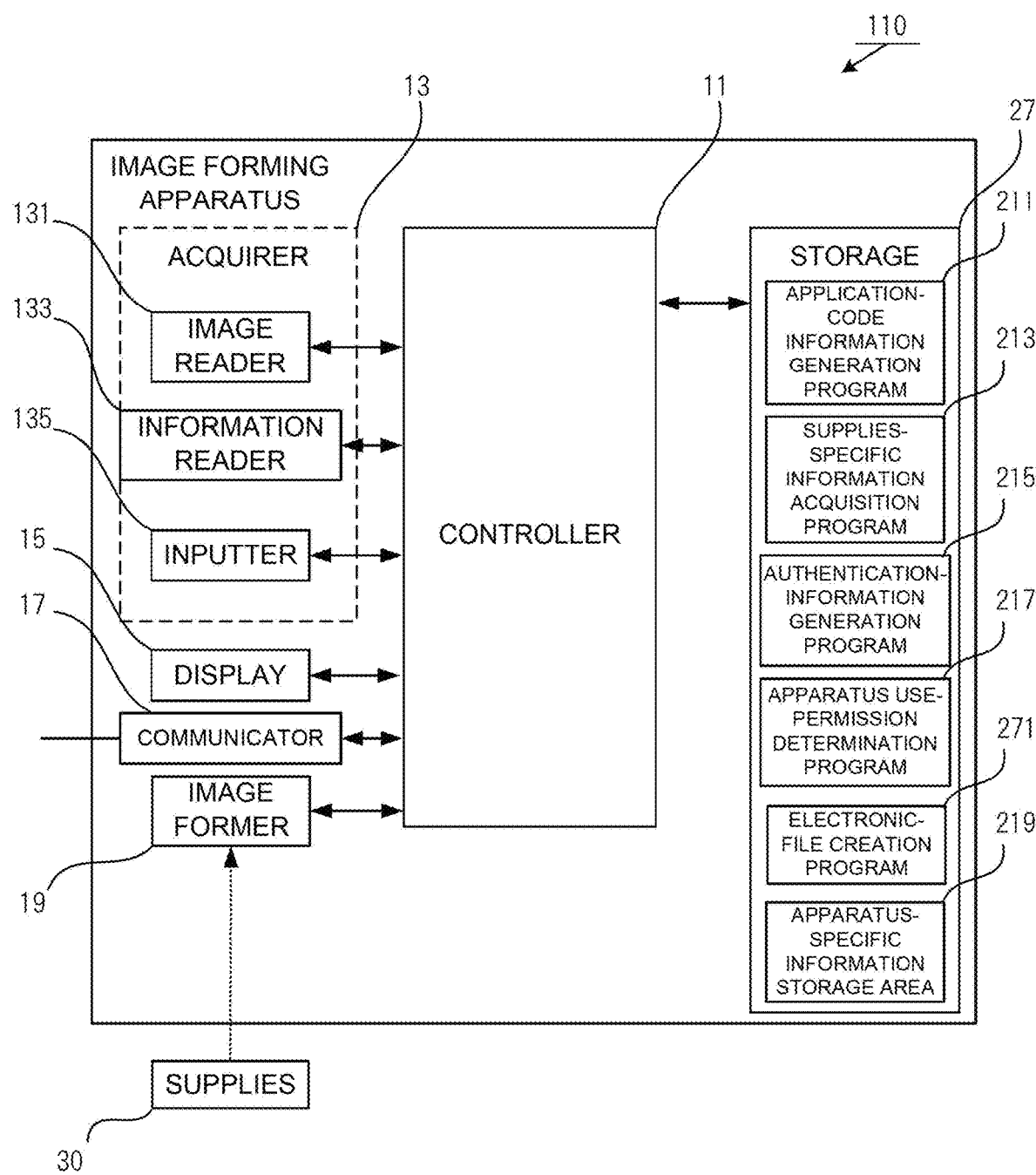
FIG. 18 is a functional configuration diagram of an image forming apparatus in the third embodiment.

FIG. 18 is a functional configuration diagram of an image forming apparatus 110 to which an electronic file generation function is added. It is to be noted that the same functional configuration as that of the image forming apparatus 10 shown in FIG. 2 is given the same sign, and the description thereof is omitted.

The image forming apparatus 110 includes a storage 27 in place of the storage 21 included in the image forming apparatus 10. The storage 27 stores the application-code information generation program 211, the supplies-specific information acquisition program 213, the authentication-information generation program 215, the apparatus use-permission determination program 217, and an electronic-file creation program 271, and secures the apparatus-specific information storage area 219.

The electronic-file creation program 271 is a program that is read by the controller 11 when outputting a file containing the application code information as an electronic file (a PDF (Portable document format) file, for example) or the like.

The controller 11 can convert the application code information into an electronic file by reading the electronic-file creation program 271 after generating the application code information at step S30 in FIG. 4, for example.

The application code information which was made into an electronic file can be output to a recording medium as a document in the form of the transmittal letter 90 shown in FIG. 16 and sent to the service center 100 by mail or a fax device.

Moreover, the application code information which was made into an electronic file can also be sent to the service center 100 using an electronic mail function included in an information processing terminal 70 such as a PC (Personal computer) or the like connected to the network NW in FIG. 15, for example. Further, when the service center 100 accepts the application code information via the Web service, for example, the application code information can be sent by uploading the application code information which was made into the electronic file via the application screen offered by the Web service. Further, if the information processing terminal 70 includes a driver program that enables operation control of the image forming apparatus 110 and is configured to enable sending/receiving of information to/from the application server devices 50 and 60 of the service center 100, it is also possible to send the application code information which was made into an electronic file via the driver program.

3-3. Use of Mobile Communication Terminals

The application code information output by the image forming apparatus 10 can be sent to the service center 100 or the application server devices 50, 60 by using a communication function and an image pickup function included in a mobile communication terminal such as a mobile phone, a smart, phone or a tablet, for example. This embodiment will be described below.

3-3-1 Mobile Communication Terminals

As shown in FIG. 15, a mobile communication terminal 80 of this embodiment is connected to the network NW and is configured to be able to send/receive information to/from the service center 100 or the application server devices 50 and 60.

Figure 19:
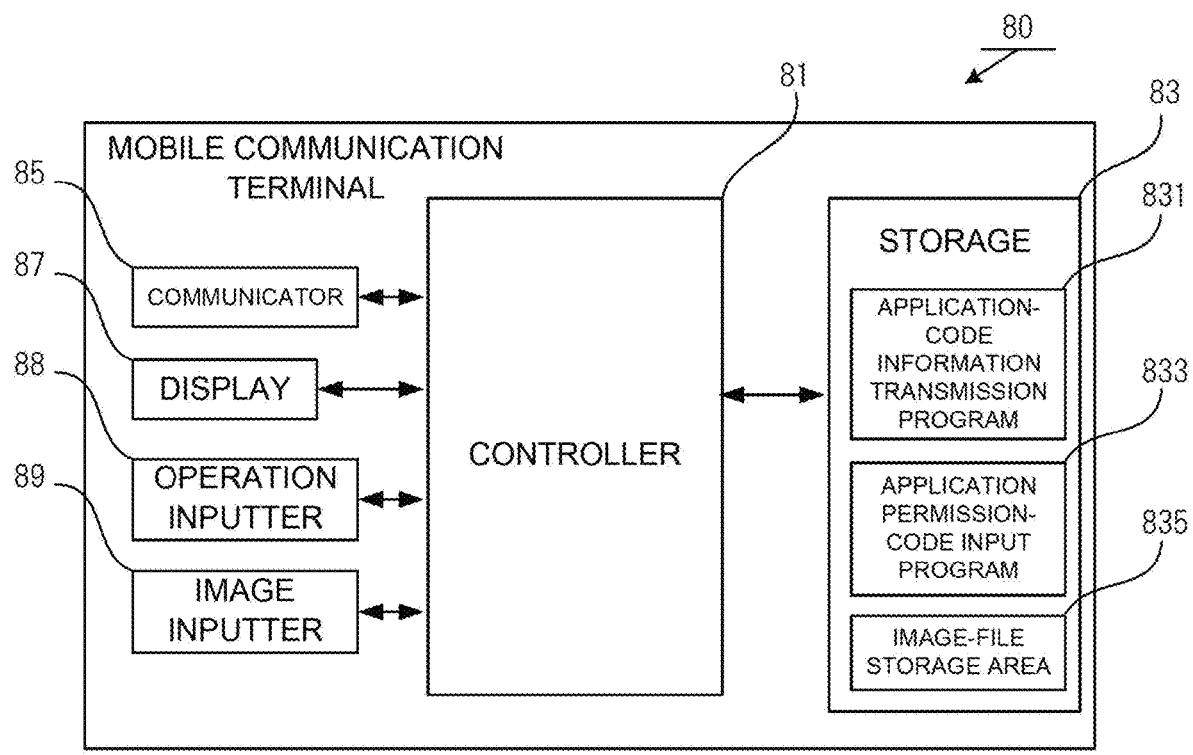
FIG. 19 is a functional configuration diagram of a mobile communication terminal in the third embodiment.

FIG. 19 is a functional configuration diagram of the mobile communication terminal 80. The mobile communication terminal 80 has a controller 81, a storage 83, a communicator 85, a display 87, an operation inputter 88, and an image inputter 89.

The controller 81 is constituted by one or a plurality of arithmetic devices (CPU and the like, for example), and realizes various functions by reading and executing various programs stored in the storage 83. In this embodiment, the controller 81 realizes each function by reading and executing an application-code information transmission program 831 and an application permission-code input program 833 described below.

The storage 83 stores various programs and various types of data necessary for the operation of the mobile communication terminal 80. The storage 55 can be configured by, for example, an SSD which is a semiconductor memory, an HDD or the like.

In this embodiment, the storage 83 stores the application-code information transmission program 831 and the application permission-code input program 833, and secures an image-file storage area 835.

The application-code information transmission program 831 is a program that is read by the controller 81 when the application-code information confirmation screen W40 (FIGS. 8A and 8B) displayed via the display 15 of the image forming apparatus 10 is taken in, and the acquired application code information is transmitted, for example.

The application permission-code input program 833 is a program that is read by the controller 81 when displaying the accepted application permission code to the user and prompting the user to input the application permission code to the image forming apparatus 10.

The image-file storage area 835 is an area in which image signals input from the image inputter 89 are stored as image files.

The communicator 85 is connected to other devices via the network and sends/receives various types of information. The communicator 85 can be constituted by a communication module that can be connected to an NIC used in a wired/wireless LAN or an LTE (Long Term Evolution)/LTE-A (LTA-Advanced)/LAA (License-Assisted Access using LTE)/5G line, for example.

The display 87 is a functional section for displaying various types of information, and is configured by an LCD or the like, for example. Moreover, the operation inputter 88 accepts operations of a user using the mobile communication terminal 80. The operation inputter 88 is constituted by a touch panel and buttons, for example. A method for detecting an input on the touch panel may be any general detection method such as a resistive film method, an infrared method, an electromagnetic induction method, and a capacitance method.

The image inputter 89 inputs an image signal transmitted from an image pickup device such as a camera and stores it as an image file in the image-file storage area 835. The image inputter 89 may be configured by a camera built in the mobile communication terminal 80, or may be configured as a terminal for connecting to a camera that is an external device, for example.

Figure 20:
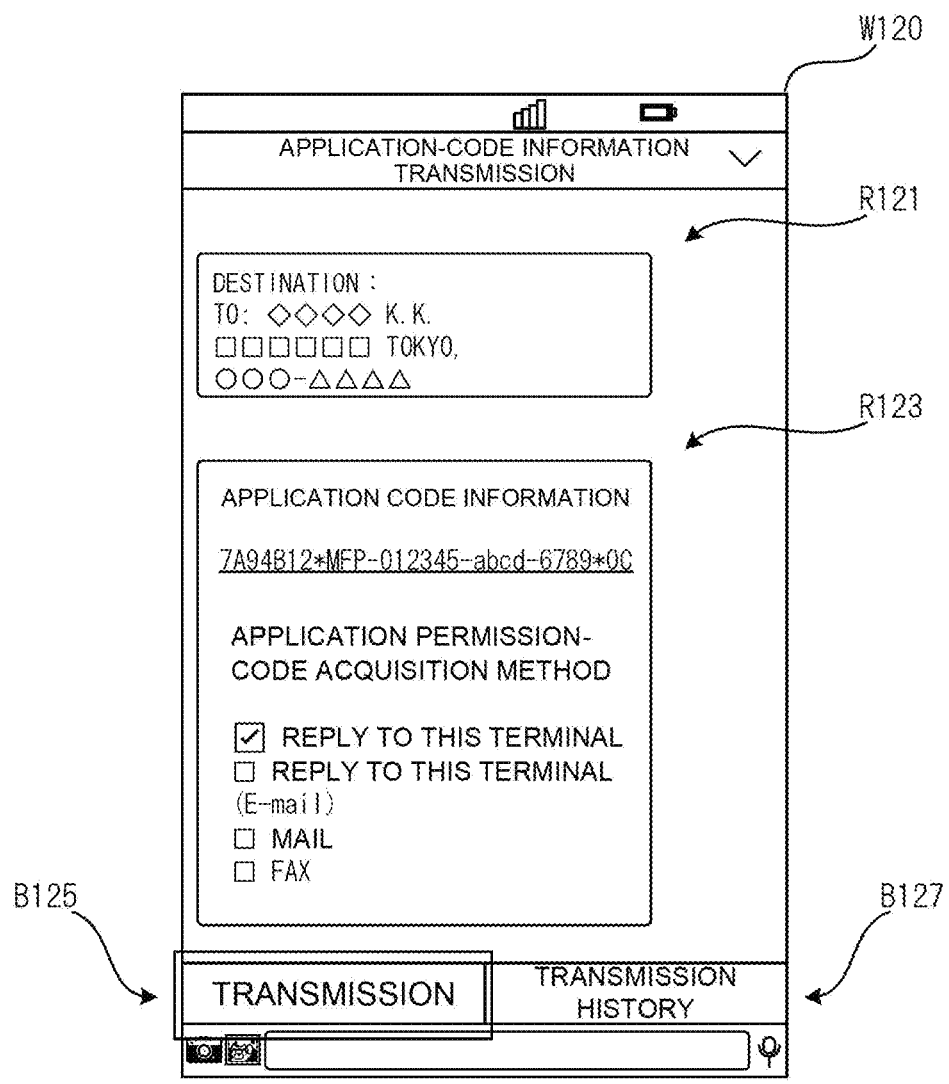
FIG. 20 is a diagram for explaining a configuration example of an application code information sending screen in the third embodiment.
Figure 21:
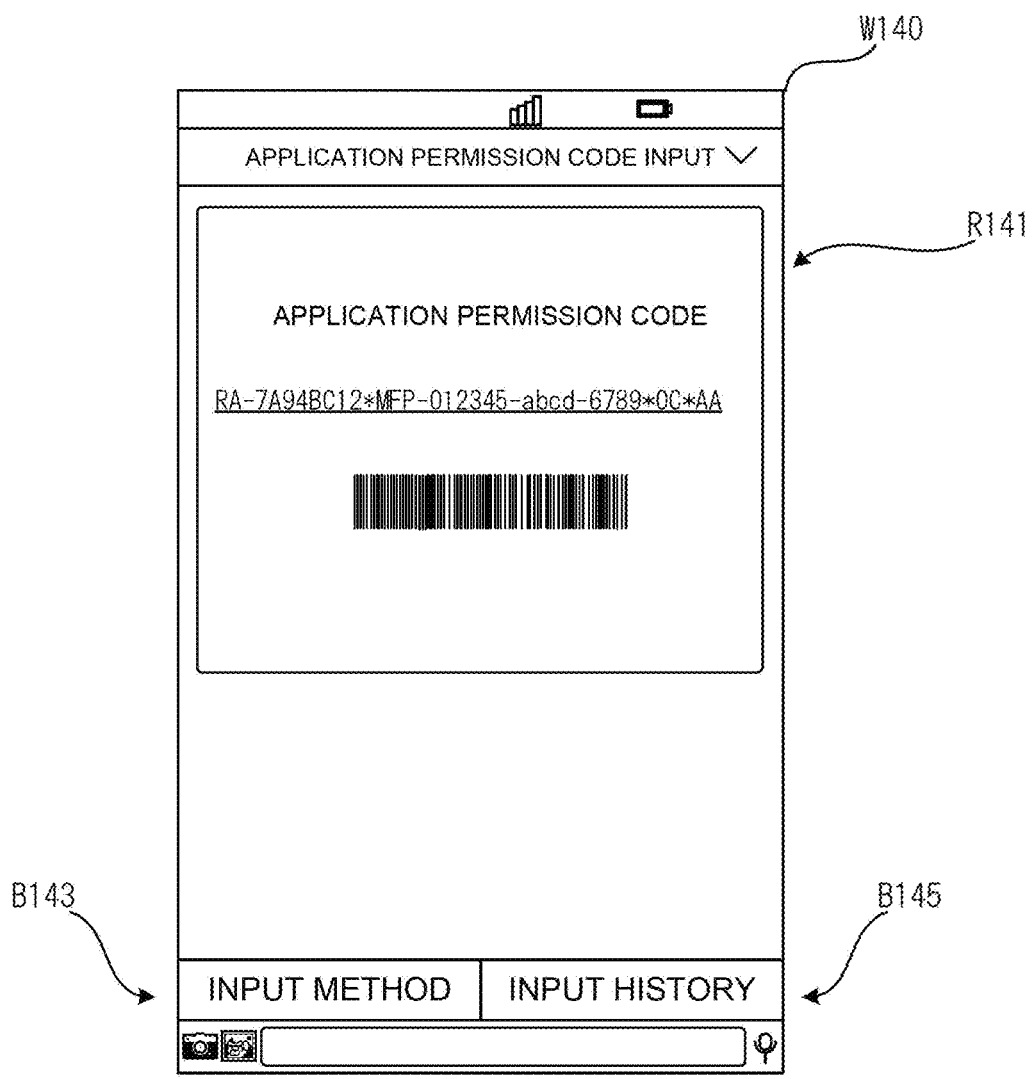
FIG. 21 is a diagram for explaining a configuration example of an application permission-code input screen in the third embodiment.

Next, the application code information is transmitted by the mobile communication terminal 80 according to this embodiment, and the input processing of the application permission code received on the basis of the transmitted application code information is described using FIGS. 20 and 21. FIG. 20 is an example of a configuration of an application-code information transmission screen W120 displayed via the display 87 of the mobile communication terminal 80. FIG. 21 is an example of a configuration of an application permission-code input screen W140 displayed via the display 87 of the mobile communication terminal 80.

For example, the user picks up images of the application-code information confirmation screen 40 shown in FIGS. 8A and 8B using an imaging device such as a built-in camera or the like. When an image file based on the screen is stored in the image-file storage area 835 via the image inputter 89, the controller 81 reads the application-code information transmission program 831.

The controller 81 extracts a portion pertaining to the application code information from the image file and generates the application-code information transmission screen W120 as shown in FIG. 20. The application-code information transmission screen W120 according to this embodiment includes a transmission-destination display area R121 indicating a transmission destination of the application code information, an application-code information display area R123, a transmission button B125, and a transmission history button B127, for example.

The transmission-destination display area R121 is a display area in which the transmission destination of the application code information is displayed. The transmission destination of the application code information may be manually entered by the user, or a past transmission history may be referred to by operating the transmission history button B127, or these may he used together.

The application-code information display area R123 is a display area where the application code information extracted from the image file is displayed. In addition to the application code information, a selection screen display area may be provided in the application code information display area R123 to accept selection of the method of acquiring the application permission code generated for the application code information to be transmitted this time, for example. Here, an example in which the user selects that the user wants to send a reply to this mobile communication terminal as a method of acquiring the application permission code is illustrated.

The transmission button B125 is a button to be pressed when the contents displayed in the transmission-destination display area R121 and the application-code information display area 123 are correct, and the user's intention to send is determined. When the transmission button is pressed, the controller 81 causes the application code information displayed in the application-code information display area R123 to be sent to the transmission destination displayed in the transmission-destination display area R121 via the communicator 85.

The transmission history button B127 is a button that accepts the pressing when referring to the transmission history of application code information transmitted in the past. When the transmission history button is pressed, the controller 81 causes the transmission history of the application code information transmitted in the past to be displayed.

Upon receipt of the application permission code from the service center 100 or the application server devices 50 and 60, the controller 81 generates an application permission-code input screen W140 as shown in FIG. 21 by reading the application permission-code input program 833. The application permission-code input screen W140 of this embodiment has, for example, an application permission-code display area R141, an input method button B143, and an input history button B145.

The application permission-code input screen W140 is a display area in which the application permission code generated on the basis of the transmitted application code information is displayed. Here, an example in which, in addition to the character information of the accepted application permission-code (RA-7A94BC12*MFP-012345-abcd-6789*OC*AA), the identification code corresponding to the application permission information (a one-dimensional barcode, for example) is displayed is shown. The user can directly input the displayed application permission code as the character information via the inputter 135 of the image forming apparatus 10, or the user can cause the displayed identification code to be read via the image reader 131 of the image forming apparatus 10.

The input method button B143 is a button to accept the selection of the input method of the application permission code for the image forming apparatus 10. For example, the input method of the application permission code to the image forming apparatus 10 may include, in addition to direct input of the character information of the application permission code, reading by using the identification code of the application permission code, direct transmission of the received application permission code to the image forming apparatus 10 and the like. The user can select the desired input method by pressing the relevant input method button.

The input history button B145 is a button that accepts pressing when referring to the input history of the application permission code input in the past. When the input history button is pressed, the controller 81 causes the input history of the application permission code applied in the past to be displayed.

The user can input an application permission code to the image forming apparatus 10 in a desired method via the application permission-code input screen W140.

In this embodiment, a form in which the mobile communication terminal 80 picks up the image of the application code information generated by the image forming apparatus 10 and sends it to the service center, the application server device and the like is described. However, regardless of this form, such a form may be used that an image of the supplies-specific information of the supplies is picked up or read by using the image pickup function of the mobile communication terminal 80, an access is made to the application server devices 50 and 60 using the communication function, and the application permission code conforming to the apparatus-specific information of the image forming apparatus 10 and the authentication information are acquired as necessary. The acquired application permission code may be transmitted from the mobile communication terminal 80 to the image forming apparatus 10 by WIFI, NFC or the like, or the character information, or identification code of the application permission code displayed on the display 87 of the mobile communication terminal 80 may be read by the image reader 131 of the image forming apparatus 10.

As described above, according to this embodiment, it becomes possible to carry out the application procedure for apparatus use permission, which involves determination on recommended supplies reliably and at an appropriate timing without bothering the user, even for an image forming apparatus that is isolated from an external network for reasons such as security or simply because there is no need to connect to an external network.

4. Fourth Embodiment

Next, a fourth embodiment will be described. The fourth embodiment is an embodiment in which measures are taken to prevent inappropriate use of the apparatus in connection with the input operation of the application permission code when the image forming apparatus shown in the first to third embodiments is used.

4-1. Application-Code Information Regeneration-Restriction Function

Figure 22:
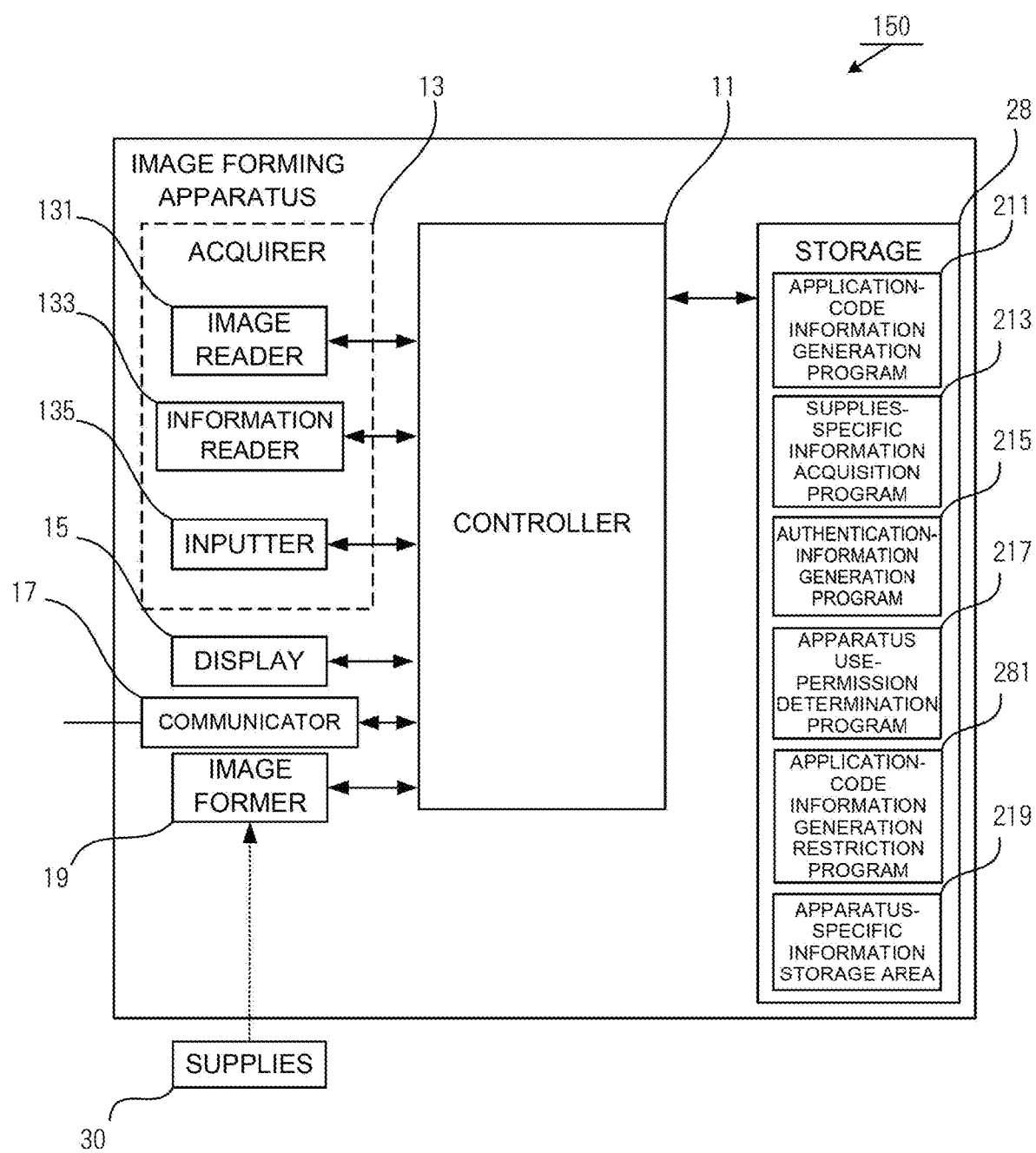
FIG. 22 is a functional configuration diagram of an image forming apparatus in a fourth embodiment.

FIG. 22 is a functional configuration diagram of an image forming apparatus 150 to which an application-code information regeneration-restriction function is added. It is to be noted that the same functional configuration as that of the image forming apparatus 10 shown in FIG. 2 is given the same sign, and the description thereof is omitted.

The image forming apparatus 150 includes a storage 28 in place of the storage 21 included in the image forming apparatus 10. The storage 28 stores the application-code information generation program 211, the supplies-specific information acquisition program 213, the authentication-information generation program 215, the apparatus use-permission determination program 217, and an application-code information generation-restriction program 281, and secures the apparatus-specific information storage area 219.

The application-code information generation-restriction program 281 is a program that is read by the controller 11 when restricting the regeneration of the application code information when the input application permission code is not a proper code.

Figure 23:
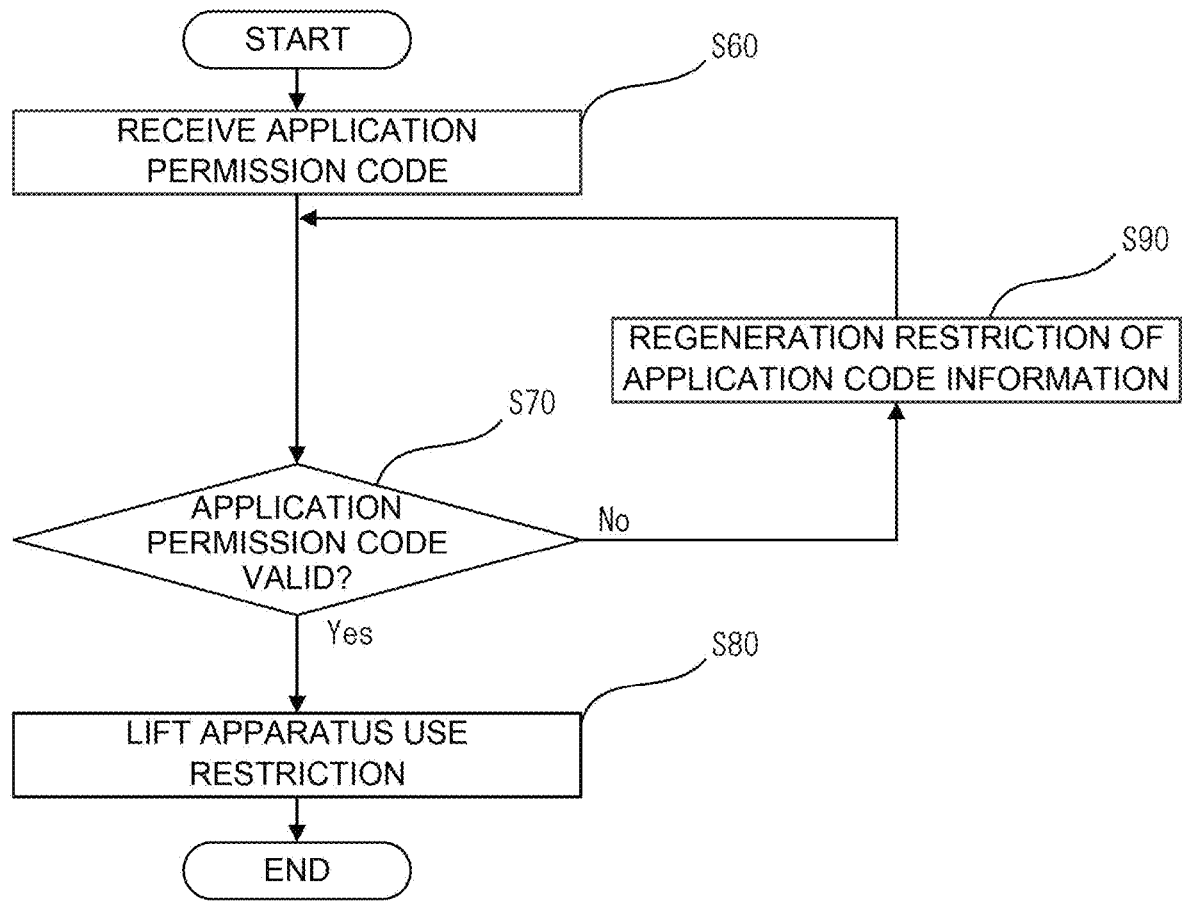
FIG. 23 is a flowchart illustrating a process of restricting regeneration of an application permission code in the fourth embodiment.

FIG. 23 is a diagram for explaining processing executed by the image forming apparatus 150 when the received application permission code is not valid. For the same processing as that in FIG. 6, the same step number is given, and the explanation thereof is omitted.

If the controller 11 determines that the application permission code is not valid (step S70; No), the controller 11 reads the application-code information generation-restriction program 281. The controller 11 restricts the regeneration of the application code information by inhibiting the function of the application-code information generation program 211 (step S90). Then, the controller 11 repeats the processing until the application permission code is determined to be valid.

As described above, according to this embodiment, inappropriate use of the apparatus can be prevented by restricting the regeneration of application code information until a valid application permission code is input.

4-2. Application Permission-Code Input-Restriction Function

Figure 24:
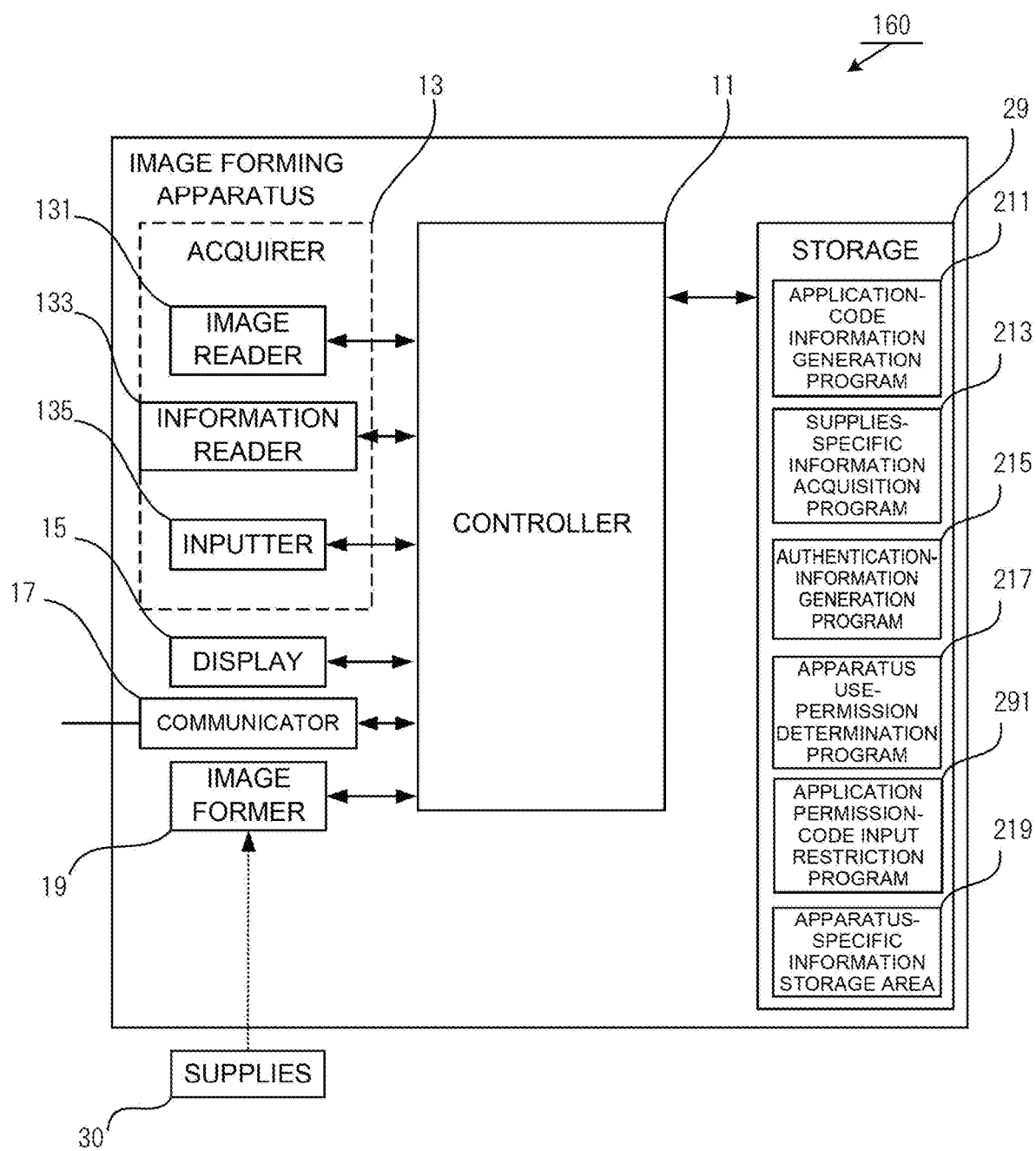
FIG. 24 is a functional configuration diagram of another image forming apparatus in the fourth embodiment.

FIG. 24 is a functional configuration diagram of an image forming apparatus 160 to which an application permission-code input-restriction function is added. It is to be noted that the same functional configuration as that of the image forming apparatus 10 shown in FIG. 2 is given the same sign, and the description thereof is omitted.

The image forming apparatus 160 includes a storage 29 in place of the storage 21 included in the image forming apparatus 10. The storage 29 stores the application-code information generation program 211, the supplies-specific information acquisition program 213, the authentication-information generation program 215, the apparatus use-permission determination program 217, and an application permission-code input-restriction program 291, and secures the apparatus-specific information storage area 219.

The application permission-code input-restriction program 291 is a program that is read by the controller 11 when an input error of the application permission code occurs consecutively.

Figure 25:
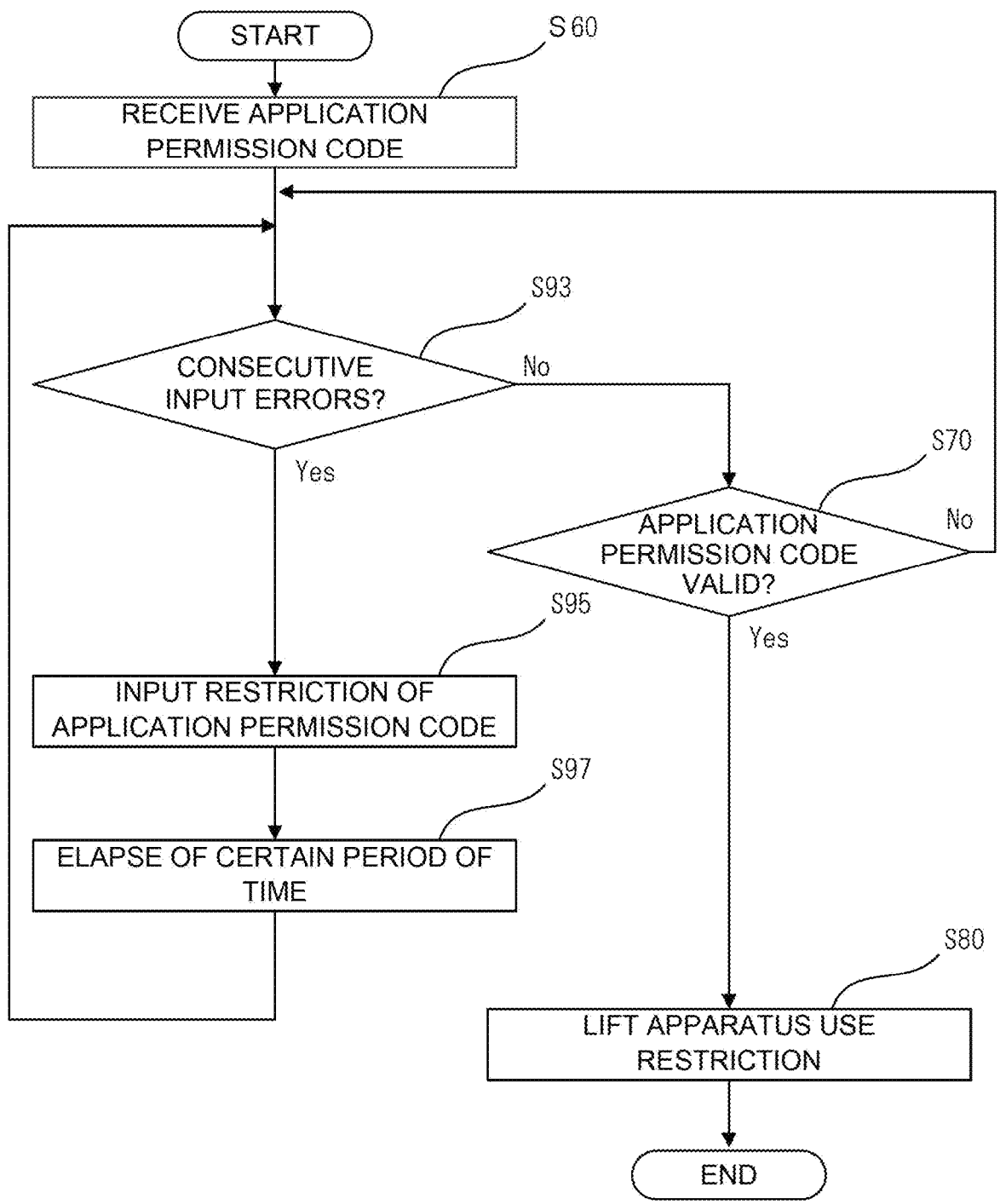
FIG. 25 is a flowchart for explaining a process of restricting input of the application permission code in the fourth embodiment.

FIG. 25 is a diagram for explaining processing executed by the image forming apparatus 160 in a case where an input error of a received application permission code occurs consecutively. For the same processing as that in FIG. 6, the same step number is given, and the explanation thereof is omitted.

After receiving the application permission code, if the controller 11 determines that an input error of the application permission code has occurred consecutively (step S93; Yes), the controller 11 restricts input of the application permission code (step S95). And after a certain period of time has elapsed (step S97), the controller 11 permits the input of the application permission code. On the other hand, the controller 11 determines whether or not the application permission code is valid when the input error of the application permission code has not occurred consecutively (step S93: No). If it is determined that the application permission code is valid (step S70 Yes), the controller 11 lifts the apparatus use restriction (step S80). On the other hand, if it is determined that the application permission code is not valid (step S70; No), the controller 11 repeats the processing until the application permission code is determined to be valid.

As described above, according to this embodiment, if an input error of the application permission code occurs consecutively, the inappropriate use of the apparatus can be prevented by restricting the input of the application permission code for a certain period of time. In this case, processing such as adding the input restriction time according to the number of input errors may be added.

5. Variation

The present invention is not limited to the above-described embodiments, and various modifications can be made. That is, embodiments obtained by combining techniques appropriately changed within a range not departing from the gist of the present invention are also included in the technical scope of the present invention.

In addition, while the above-described embodiments have parts described separately for convenience of explanation, it is needless to say that the embodiments may be combined and executed within the technically possible range.

It is to be noted that, in this embodiment, together with the generation of the application code information, a stop code to stop the use of the image forming apparatus may be generated on the basis of an instruction the user. For example, if the image forming apparatus that generated the application code information fails, the apparatus needs to be replaced with a replacement or a new one. In this case since it becomes physically impossible to use the supplies pertaining to the application in the relevant image forming apparatus, the use of the apparatus itself is stopped by inputting the stop sign so that the supplies can be used in other image forming apparatuses.

In this embodiment, the form in which the application code information is generated by the combination of the supplies-specific information, apparatus-specific information, and authentication information such as one-time code, if necessary, is described, but for example, the form in which the application code information based on the combination of apparatus-specific information and authentication information is generated is also acceptable. In this case, for example, reuse of application code information that has been used in the past can be prevented by using authentication information associated with date and time information of the application server device or by using authentication information corresponding to acceptance authentication information received from the application server device.

In addition, the program that operates in each apparatus in the embodiments is a program that controls a CPU or the like (a program that causes a computer to function) so as to realize the functions of the above-described embodiments. Moreover, the information handled by these apparatuses is temporarily stored in a temporary storage device (for example, a RAM at the time of processing, and then stored in various storage devices such as a ROM (Read Only Memory), an HDD and the like, and is read, corrected/written by the CPU as necessary.

Here, as the recording medium for storing the program, a semiconductor medium (for example, a ROM, a non-volatile memory card and the like), an optical recording medium/magneto-optical recording medium (for example, a DVD (Digital Versatile Disc), an MO (Magneto Optical Disc), an MD (Mini Disc), a CD (Compact Disc), a BD (Blu-ray Disk (registered trademark) and the like), a magnetic recording medium (for example, a magnetic tape, a flexible disk and the like) or the like may be used. In addition to a case where the functions of the above-described embodiments are realized by executing a loaded program, there may be a case where the functions of an aspect of the present invention are realized by processing in collaboration with the operating system or other application programs on the basis of the instructions of the program.

Furthermore, in the case of distribution to the market, the program can be stored and distributed in a portable recording medium, or transferred to a server computer connected via a network such as the Internet. In this case, it goes without saying that the storage device of the server computer is also included in the present invention.

What is claimed is:

1. An image forming apparatus comprising:
   an acquirer that acquires supplies-specific information uniquely attached to supplies used or consumed in image formation;
   a storage that stores apparatus-specific information; and
   a controller that generates a one-time code as authentication information and also generates application code information for applying for apparatus use permission using the one-time code, the supplies-specific information, and the apparatus-specific information.

2. The image forming apparatus according to claim 1, further comprising:
   a communicator that transmits the application code information and receives an application permission code that permits use of the apparatus, wherein
   the controller permits use of the apparatus on the basis of the received application permission code.

3. The image forming apparatus according to claim 2, wherein
   the controller determines, upon receipt of the application permission code, whether the application permission code is for the transmitted application code information or not on the basis of a one-time code contained in the application permission code and the one-time code stored in the storage.

4. The image forming apparatus according to claim 1, wherein
   the acquirer acquires the supplies-specific information by any one of an image reader, an information reader, and an inputter that accepts input by a user.

5. The image forming apparatus according to claim 1, further comprising:
   a display that displays the application code information to the user.

6. The image forming apparatus according to claim 1, wherein
   the application code information is recorded on a recording medium by image formation.

7. The image forming apparatus according to claim 1, further comprising:
   an electronic file outputter that outputs the application code information as an electronic file.

8. The image forming apparatus according to claim 2, wherein
   the controller does not re-generate the application code information until the application permission code is input.

9. The image forming apparatus according to claim 2, wherein
   the controller prohibits the input of the application permission code for a certain period of time when an incorrect application permission code is input consecutively.

10. An application permission system comprising:
    an image forming apparatus having an acquirer that acquires supplies-specific information uniquely attached to supplies used or consumed in image formation, a first storage that stores apparatus-specific information, and a first controller that generates a one-time code as authentication information and generates application code information for applying for apparatus use permission using the one-time code, the supplies-specific information, and the apparatus-specific information; and
    a server device having a communicator that receives the application code information, a second storage that stores the supplies-specific information, and a second controller that authenticates the one-time code and determines whether newly received supplies-specific information is unregistered or not by collating the newly received supplies-specific information against the supplies-specific information stored in the second storage, wherein
    when the second controller determines that the newly received supplies-specific information is determined to be unregistered, the second controller generates an application permission code that permits the use of the apparatus, and causes the application permission code to be transmitted to a sender of the application code information via the communicator.

11. An application-code information generation method, comprising:
    acquiring supplies-specific information uniquely attached to supplies used or consumed in image formation;
    storing apparatus-specific information; and
    generating a one-time code as authentication information and generating of application code information for applying for apparatus use permission using the one-time code, the supplies-specific information, and the apparatus-specific information.

* * * * *